US011869758B2

(12) United States Patent
Hager

(10) Patent No.: US 11,869,758 B2
(45) Date of Patent: Jan. 9, 2024

(54) MASS SEPARATOR FOR USE IN A MASS SPECTROMETRY SYSTEM

(71) Applicant: DH Technologies Development Pte. Ltd., Singapore (SG)

(72) Inventor: James Hager, Mississauga (CA)

(73) Assignee: DH Technologies Development Pte. Ltd.

( * ) Notice: Subject to any disclaimer, the term of this patent is extended or adjusted under 35 U.S.C. 154(b) by 364 days.

(21) Appl. No.: 17/270,493

(22) PCT Filed: Aug. 21, 2019

(86) PCT No.: PCT/IB2019/057049
§ 371 (c)(1),
(2) Date: Feb. 23, 2021

(87) PCT Pub. No.: WO2020/039368
PCT Pub. Date: Feb. 27, 2020

(65) Prior Publication Data

US 2023/0147220 A1 May 11, 2023

Related U.S. Application Data

(60) Provisional application No. 62/722,527, filed on Aug. 24, 2018.

(51) Int. Cl.
*H01J 49/06* (2006.01)
*H01J 49/42* (2006.01)

(52) U.S. Cl.
CPC ........ *H01J 49/063* (2013.01); *H01J 49/4225* (2013.01); *H01J 49/4215* (2013.01)

(58) Field of Classification Search
CPC ... H01J 49/063; H01J 49/4225; H01J 49/4215
See application file for complete search history.

(56) References Cited

U.S. PATENT DOCUMENTS

| | | | |
|---|---|---|---|
| 2005/0242279 A1 | 11/2005 | Verentchikov | |
| 2013/0146759 A1 | 6/2013 | Ouyang | |
| 2017/0103880 A1 | 4/2017 | Syage | |

OTHER PUBLICATIONS

International Search Report and Written Opinion for PCT/IB2019/057049 dated Dec. 17, 2019.

*Primary Examiner* — Nicole M Ippolito
*Assistant Examiner* — Hanway Chang

(57) ABSTRACT

Systems and methods disclosed herein utilize an interface positioned between an ion source and an ion guide of a mass spectrometry system that can be useful to control transmission ions from an ion source to a downstream mass analyzer. In various aspects, the present disclosure provides methods of modulating an introduction of ions into an ion guide. In some embodiments, the present disclosure provides methods of making and using disclosed interface elements and mass spectrometry systems. In some embodiments, implementations of the present disclosure are useful in mass spectrometry systems, including, for example, improving signal-to-noise and reducing contamination.

21 Claims, 9 Drawing Sheets

MASS SEPARATOR FOR USE IN A MASS SPECTROMETRY SYSTEM

RELATED APPLICATION

This application claims priority to U.S. provisional application No. 62/722,527 filed on Aug. 24, 2018, entitled "Mass Separator for Use in a Mass Spectrometry System," which is incorporated herein by reference in its entirety.

FIELD

The invention relates to mass spectrometry, and more particularly to apparatus and methods useful for regulating pressure and for separating ions according to their m/z ratios within mass spectrometry systems.

BACKGROUND

Mass spectrometry is an analytical technique for determining the elemental composition of test substances with both quantitative and qualitative applications. For example, mass spectrometry can be used to identify unknown compounds, to determine the isotopic composition of elements in a molecule, and to determine the structure of a particular compound by observing its fragmentation, as well as to quantify the amount of a particular compound in the sample.

In mass spectrometry, sample molecules are generally converted into ions using an ion source and then separated and detected by one or more mass analyzers. For most atmospheric pressure ion sources, ions pass through an inlet orifice prior to entering an ion guide disposed in a vacuum chamber. In conventional mass spectrometry systems, a radio frequency (RF) signal applied to the ion guide provides collisional cooling and radial focusing along the central axis of the ion guide as the ions are transported into a subsequent, lower-pressure vacuum chamber in which the mass analyzer(s) are disposed.

Ionization at atmospheric pressure (e.g., by chemical ionization, electrospray) is generally a highly efficient means of ionizing molecules within the sample. Atmospheric ionization of ions can create analytes of interests, as well as interfering/contaminating ions and neutral molecules in high abundance.

SUMMARY

The present disclosure encompasses a recognition that in mass spectrometry systems, an influx of ions channeled downstream can result in a low signal-to-noise ratio and in contamination of downstream optical components. The present disclosure further encompasses a recognition that there is a need for a pressure control valve that can be operable to modulate pressure and separate ions according to their m/z ratios to control transmission of ions from an ion source to downstream components of a mass spectrometer. The detection of ions of interest that are present in low concentration can be challenging. For example, in some embodiments, a fragmentation pattern could exhibit overlap between ions of a component of interest and those of other sample components and be difficult to detect or analyze. Often the signal-to-noise ratio of such components of interest can prove to be poor enough such that any attempt for detection and/or analysis could result in wasted time and additional expense. Additionally, most ion optics (e.g., lenses) of mass spectrometry systems are subject to ion deposition due to the defocusing of the ions during transmission therethrough and may exhibit significantly different behavior following substantial contamination (e.g., loss of sensitivity). These fouled surfaces should be regularly cleaned to maintain sensitivity. While the surfaces of front-end components (e.g., curtain plates, orifice plates, QJet®, IQ0) may be relatively easy to clean, fouling of components contained within downstream high-vacuum chambers (e.g., Q0, Q1, IQ1) can result in substantial time and/or expense as these vacuum chambers must be vented and substantially disassembled prior to cleaning.

Methods and systems for controlling the downstream transmission of ions and reducing the contamination of components of mass spectrometer systems are provided herein. Among other things, the present disclosure encompasses a recognition that an interface (e.g., a pressure controlling valve) disposed between an ion source and an ion guide can be useful for selecting and separating desired ions of a sample according to their m/z ratios for detection and analysis thereby improving signal-to-noise. In some embodiments, such selecting and separating can further result in a decrease in downstream ion transmission, reducing contamination within the mass spectrometry system. In some embodiments, the present disclosure provides an interface that is useful to control introduction and transmission of ions into and through the mass spectrometry system. In some embodiments, the present disclosure provides methods of controlling and/or modulating the introduction of ions into an ion guide and transmission of those ions downstream in the mass spectrometry system. In some embodiments, the present disclosure provides methods of fabricating an interface and using it in a mass spectrometry system. By reducing transmission of ions, the mass spectrometry systems of present disclosure exhibit improved robustness, and/or decreased downtime typically required to vent/disassemble/clean fouled components. In some embodiments, the disclosed methods and systems operate to maintain stability of an ion source while continuously producing ions.

In some embodiments, mass spectrometry systems according to the present teachings can include an ion source, an ion guide, and a mass analyzer. The ion source can be located within or near an ion source region. The ion guide can be housed within an ion guide chamber that is disposed downstream from the ion source region. The mass analyzer can be housed within a vacuum chamber that is located downstream from the ion source region. In some embodiments, the mass spectrometry systems can include an interface, by way of example, a pressure control valve, that is disposed downstream form the ion source region. In some embodiments, the interface is positioned between the ion source region and the ion guide chamber. In some embodiments, the interface disposed between the ion source region and the ion guide chamber can be a valve. In some embodiments, the valve of the interface can be configured to control, modulate, and/or regulate transmission of ions that are generated at the ion source. In some embodiments, the present disclosure provides mass spectrometry systems, which can include one or more controllers and one or more power supplies for actuating, controlling, modulating, positioning, and/or switching the valve of the interface between a plurality of states. In some embodiments, the plurality of states can include the valve of the interface positioned in a closed state, an opened state, and/or various states in between a fully closed state and a fully opened state. The one or more controllers can modulate the power applied to the valve of the interface and thereby can cause the valve to switch from a closed state to an opened state before returning it again to the closed state. In some embodiments, controlling and/or modulating the interface can result, for example, in a lower pressure in the ion guide chamber than that applied during typical operation of a mass spectrometry system and/or in a higher pressure in the ion guide chamber than that applied during typical operation of a mass spectrometry system. In some embodiments, actuating, controlling, modulating, positioning, and/or switching the valve of the interface from the closed state to the opened state can result in exposure by the ion guide chamber to a burst of pressure from ions and neutrals present in the ion source region. In some embodiments, when the interface is returned to the closed state the burst in the internal pressure of the ion guide chamber can decrease to the lower pressure range. The present disclosure encompasses recognition that the burst in pressure in the ion guide chamber followed by a return to the low-pressure conditions can result in a separation of ions according to their m/z ratios, in particular a rise in intensity of certain ions having a particular m/z ratio or m/z ratios in a particular range.

In some embodiments, an ion source used in a mass spectrometry system to generate ions can operate at or near atmospheric pressure, e.g., it can be an atmospheric ionization source.

In some embodiments, the mass spectrometry systems according to the present teachings can include an ion guide housed in an ion guide chamber that can be positioned downstream of the ion source. In some embodiments, the mass spectrometry systems can include more than one ion guide that can be disposed in one or more downstream ion guide chambers.

In some embodiments, the ion guide positioned downstream of the ion source can be configured to receive, select, channel, and/or transmit the generated ions to a mass analyzer. In some embodiments, the ion guide chamber can include an inlet orifice and at least one exit orifice. In some embodiments, the ion source region is fluidly connected to the ion guide chamber. In some embodiments, the ion guide chamber is configured for receiving ions from the ion source. In some embodiments, the ion guide chamber is or can be maintained at a pressure in a range from about less than $5\times10^{-3}$ Torr (e.g., about $5\times10^{-5}$ Torr) to about 5 Torr.

In some embodiments, the ion guide disposed in the ion guide chamber can be a quadrupole ion guide. In some embodiments, the quadrupole ion guide can include a quadrupole rod set with rods that can extend from a proximal end disposed adjacent the inlet orifice of the ion guide chamber to a distal end disposed adjacent the exit orifice of the ion guide chamber. In some embodiments, the quadrupole rod set can include a first pair of quadrupole rods and a second pair of quadrupole rods. In some embodiments, each rod of the quadrupole rod set is spaced from and extends alongside a central longitudinal axis of the ion guide chamber.

In some embodiments, mass spectrometry systems as provided herein can include a vacuum chamber that can house at least one mass analyzer. In some embodiments, the vacuum chamber housing the at least one mass analyzer is positioned downstream from the ion guide chamber and can be fluidly connected thereto. In some embodiments, at least one exit orifice can be configured to pass ions from the ion guide chamber to downstream components of the mass spectrometry system. In some embodiments, the mass analyzer vacuum chamber is or can be maintained at a low pressure. For example, the vacuum chamber housing of the mass analyzer can be maintained at a lower pressure than that of the ion guide chamber to which it is connected, that is for example, the low pressure of the mass analyzer vacuum chamber is less than about $1\times10^{-4}$ Torr, (e.g., about $5\times10^{-5}$ Torr). In some embodiments, a vacuum chamber is or can be maintained at a same pressure as that of an ion guide chamber to which it is connected. In some embodiments, a vacuum chamber is or can be maintained at a lower pressure than that of an ion guide chamber to which it is connected. A mass analyzers could include, for example: triple quadrupoles, linear ion traps, quadrupole time of flights, Orbitrap, or other Fourier transform mass spectrometry systems, etc.

In some embodiments, the mass spectrometry systems as provided herein can include an interface that is disposed between and fluidly connected between the ion source region and an ion guide chamber. In some embodiments, the interface can be mounted between an ion source and an ion guide chamber. In some embodiments, the interface can be mounted on a mounting snout or interface snout. In some embodiments, the mounting snout is mounted on a front surface of the ion guide chamber at the inlet orifice.

In some embodiments, an interface includes an opening that leads to an inlet segment to a valve and through an outlet segment to an exit. In some embodiments, the interface opening has an internal cross-section and/or diameter, which can be, for example, in a range of about 0.1 mm to about 0.7 mm. In some embodiments, the opening is elongated, for example, tubular. In some embodiments, the interface has an internal cross-section and/or diameter of about 0.32 mm. In some embodiments, the interface includes a valve. In some embodiments, the valve of the interface can be positioned in one of a plurality of states. In some embodiments, the plurality of states can include the valve in an opened state such that the ion source region is fluidly connected to the ion guide chamber. In some embodiments, the plurality of states can include the valve in a closed (e.g., substantially sealed) state such that the ion source region is mechanically disconnected and/or fluidly isolated from the ion guide chamber.

In some embodiments, the valve can include a shutter, a plate, or a pinch valve, which can be disposed between the ion source and the ion guide chamber. In some embodiments, the pinch valve can include a compressible tube configured to impede passage of ions from the ion source region and the ion guide chamber. In some embodiments, the interface can include a Discontinuous Atmospheric Pressure Interface (DAPI). In some embodiments, the DAPI can be configured to directly introduce ions into the ion guide chamber. In some embodiments, the DAPI can be configured to allow introduction of ions into the ion guide.

In some embodiments, the valve of the interface can be configured to be actuated, controlled, modulated, positioned, and/or switched to transition to between an opened state, a closed state (e.g., substantially sealed), or an at least partially opened state. In some embodiments, when the interface is in the opened state, the interface can permit transmission of ions to downstream components of the mass spectrometry system. In some embodiments, when the valve of the interface is positioned in a closed state, introduction or transmission of ions can be inhibited between the ion source and the ion guide chamber. In some embodiments, the interface can be configured to be in an opened state, in which the internal pressure of the ion guide chamber can increase to a value in a range of about $10^{-3}$ Torr to about 10 Torr as the interface allows introduction and/or passage of ions into the ion guide chamber.

In some embodiments, a mass spectrometry system as provided herein can include one or more power supplies. In some embodiments, the one or more power supplies are in electrical connection with the ion source, the one or more ion guides, and the interface. In some embodiments, one or more power supplies can include one or more DC sources for applying a DC voltage and/or one or more RF sources for applying an RF voltage. In some embodiments, for example, an RF source can be coupled to an ion source for generation of ions. In some embodiments, for example, an DC source can be coupled to the interface to actuate, control, modulate, position, and/or switch the valve from the closed state to at least a partially opened state.

In some embodiments, the one or more power supplies can be in electrical communication with quadrupole rods of a quadrupole ion guide disposed in the ion guide chamber. In some embodiments, the power supply can be configured to apply electrical power in the form of a DC voltage and/or an RF voltage to the quadrupole rods. In some embodiments, the DC voltage applied to the quadrupole rods can include first and second DC voltages applied to first and second pairs of quadrupole rods of the quadrupole rod set. In some embodiments, the first and second applied DC voltages have substantially the same amplitude. In some embodiments, for example, a DC voltage applied to the quadrupole rods can have an amplitude in a range of about ±1 V to about ±200 V. In some embodiments, the RF voltage applied to the quadrupole rods can include first and second RF voltages applied to first and second pairs of quadrupole rods of the quadrupole rod set. In some embodiments, the power supplied can be configured to apply a first RF voltage to the first pair of quadrupole rods of the quadrupole rod set at a first frequency and in a first phase and a second RF voltage to the second pair of quadrupole rods of the quadrupole rod set at a second frequency equal to a first frequency and in a second phase opposite to that of the first phase. In some embodiments, the RF voltages applied to the quadrupole rod set can be configured to provide radial confinement of ions within the ion guide. In some embodiments, the RF voltage from the RF source applied to the quadrupole rod set can be configured to enhance release and transmission of ions within a desired m/z range from the ion guide to a downstream mass analyzer. In some embodiments, RF voltages have an amplitude in a range of about 50 V to about 1000 V. In some embodiments, an RF voltage has an amplitude in a range of about 10 Vp-p to about 500 Vp-p. In some embodiments, an RF voltage has a frequency in a range of about 0.25 MHz to about 2.5 MHz. In some embodiments, the one or more power supplies can be further operable to provide a supplemental electrical signal to the quadrupole rods of the quadrupole rod set. In some embodiments, the supplemental electrical signal can include one of a DC voltage and/or an AC excitation signal. In some embodiments, for example, the power supply can be configured to provide the supplemental electrical signal to the quadrupole rod set so as to generate a dipolar DC field, a quadrupolar DC field, or resonance excitation using a supplementary AC field that is resonant or nearly resonant with some of ions in an ion beam.

In some embodiments, the mass spectrometry systems can include one or more controllers. In some embodiments, the one or more controllers can be in electrical communication with the ion source, the one or more ion guide, the interface, and/or the one or more power supplies. In some embodiments, for example, the controller can communicate with the quadrupole rods of the quadrupole rod set to control the power applied thereto. In some embodiments, for example, the controller can actuate, control, modulate, position, and/or switch the valve of the interface between the plurality of states.

In some embodiments, the valve of the interface can be electrically connected to the power supply and in communication with the controller. In some embodiments, the valve of the interface can be configured to be actuated, controlled, modulated, positioned, and/or switched via an application of a DC voltage thereto. In some embodiments, the valve can be actuated, controlled, modulated, positioned, and/or switched via an application of about 2.5 to about 40 volts DC. In some embodiments, for example, the controller can be configured to provide a DC voltage to the interface, for example, to modulate the valve from the opened state (e.g., a DC voltage applied to the valve) to the closed state (e.g., a DC voltage removed therefrom the valve).

In some embodiments, the controller can be configured to provide the DC voltage to the interface according to a signal applied to or communicated to the controller. In some embodiments, the controller can be configured to intermittently apply the DC voltage to the valve of the interface according to the signal. In some embodiments, the controller can be configured to modulate the valve of the interface between the opened state and the closed state in response to a change in the pattern of the signal. In some embodiments, for example, the controller can be configured to intermittently apply the DC voltage, such that the valve is switched between states, for example, closed for a period of time, followed by opened for a period of time, before it is again closed for a period of time. In some embodiments, each period of time can be the same. In some embodiments, each period of time can be different. In some embodiments, a repeating signal or a patterned signal can be used to control application of the DC voltage. In some embodiments, the signal can cause the intermittently applied DC voltage that can be characterized by a duty cycle. The duty cycle can be expressed for example as an applied voltage times as a percentage of available time. In some embodiments, a high percentage (i.e. a high duty cycle) corresponds to a longer period (relative to the available time) in which the DC voltage is applied to the interface. In some embodiments, for example, the longer period of time in which the DC voltage is applied the valve of the interface corresponds to a longer period of time in which the valve of the interface is in the opened state before the voltage is removed and the valve is closed. Conversely, in some embodiments, a low percentage (i.e. a low duty cycle) corresponds to a shorter period (relative to the available time) in which the DC voltage is applied to the interface. In some embodiments, for example, the shorter period of time in which the DC voltage is applied to the valve of the interface corresponds to a shorter period of time in which the valve of the interface is in the opened state before the voltage is removed and the valve is closed. In some embodiments, the duty cycle for example could be about 1%; about 2%; about 3%; about 4%; about 5%; about 10%; about 15%; about 20%; about 25%; about 30%; about 35%; about 40%; about 45%; about 50%; about 60%; or about 75%.

In some embodiments, the lower duty cycle (i.e. less time of the available time in the opened state) corresponds to a smaller burst of pressure from ions, neutrals, and/or gas entering the ion guide chamber. In some embodiments, a higher duty cycle (i.e. more time of the available time in the opened state) can result in larger bursts of pressure from ions, neutrals, and/or gas entering the ion guide chamber. In some embodiments, the controller can be configured to provide a DC voltage to the valve of the interface to modulate the valve from the opened state so that the ion guide chamber is exposed to bursts of pressure from ions in the ion source region for the first period of time. In some embodiments, the controller can be configured to remove the DC voltage from the valve of the interface to modulate the valve to the closed state for a second period of time, so that the ion guide chamber pressure decreases to the lower pressure range. By way of example, in some embodiments, the controller can be configured to modulate the valve according to a signal that withholds the DC voltage for a first period of time and maintains the valve in the closed state for that period, followed by applying a DC voltage to the interface for a second period of time to actuate the valve to the opened state for that second period during which time the pressure in the ion guide chamber quickly rises as ions enter it, followed by a signal to remove the DC voltage to actuate the valve of the interface to the closed state thereby closing the valve for a period during which the burst of ions is terminated and the pressure in the ion guide chamber decreases. In some embodiments, a quick burst of pressure followed by a return to the lower pressure regime in the ion guide chamber can be a dynamic change in internal pressure.

The present disclosure encompasses a recognition that in some embodiments, a quick burst of pressure followed by a return to the lower pressure regime in the ion guide chamber can be useful to create a separation of ions according to their m/z. In some embodiments, such a dynamic change in internal pressure can create a physical separation of ions, which can be detectable by an increase in the intensity of ions having a particular m/z ratio or m/z ratios or m/z ratios in a particular range according to their arrival time at the mass analyzer. In some embodiments, a dynamic change in internal pressure can result from a pressure fluctuation, for example on an order of about 50 Torr to about $10^{-3}$ Torr in the first ion guide chamber. In some embodiments, a change in pressure in a range of about 50 Torr to about 1 mTorr in the interface. In some embodiments, a dynamic change in internal pressure can be affected, for example, by a diameter of the interface, by a time in which the valve of the interface is in an opened or closed state, by a degree or level of openness of the valve, by conduction speeds of the pass-through for the valve, by conduction speeds for the vacuum of the vacuum chambers of the mass spectrometry system, and/or by pressure regimes within and between vacuum chambers. In some embodiments, the internal cross-section and/or diameter of the interface is about 0.1 mm to about 0.7 mm. In some embodiments, the interface can be configured to an opened state during a period in a range of about 1 ms to about 100 ms. In some embodiments, the valve of the interface can be configured to switch to a closed state to inhibit introduction of ions into an ion guide during a period in a range of about 25 ms to about 1000 ms. In some embodiments, the pressure in the first ion guide chamber can be about 50 Torr to about $10^{-3}$ Torr when the valve of the interface is in an opened state and about $5\times10^{-3}$ Torr to about $5\times10^{-5}$, or less when the valve is in a closed state.

In some embodiments, the present disclosure encompasses a recognition that the dynamic change in internal pressure in the ion guide chamber can separate ions entering the ion guide chamber according to their m/z ratios. In some embodiments, the separation is detectable at a mass analyzer positioned downstream in the ion guide chamber. In some embodiments, the separation of the ions can be characterized by different arrival times of the m/z ions at the downstream mass analyzer. In some embodiments, a difference of m/z ion arrival time can be useful to enhance and/or discriminate the data and the ions. For example, in some embodiments, the m/z range of ions can be enhanced and/or discriminated by choosing a particular time window or time slice (i.e. a particular arrival time) and select and/or channel those ions having m/z ratios in that range. In some embodiments, the time window establishes condition of the dynamic change in internal pressure, for example, when the controller can be configured to cause the ion guide to release a portion of the ions formed in an ion guide. By way of example, in some embodiments, the m/z separation of the ions that is created by the dynamic change in internal pressure can be used in conjunction with the ion guide to select and isolate m/z ions by channeling and/or transmitting ions having a specific arrival time at a downstream detector and a specific m/z range, thus discriminating against other ions. In some embodiments, the mass spectrometry systems having such an arrangement can be useful to increase the relative abundances of ions within a user-defined m/z range. In some embodiments, the mass spectrometry systems having such an arrangement can be useful to reduce transmission of unwanted ions to downstream ion optical components, which can result in improved signal-to-noise and/or instrument robustness.

In some embodiments, methods as provided herein can include separating ions in a mass spectrometry system. In some embodiments, methods as provided in the present disclosure can include improving signal-to-noise ratio associated with the detector and ions. In some embodiments, methods as provided herein can include reducing contamination in a mass spectrometry system. In some embodiments, methods as provided herein can include providing a mass spectrometry system having an ion source, an ion guide, a mass analyzer, and an interface as disclosed herein.

In some embodiments, methods as provided herein can include introducing one or more pulses of ions into the ion guide so as to cause a pressure change (e.g., a dynamic change in internal pressure) in the ion guide chamber. In some embodiments, when a pulse of ions, neutrals, and gas enters the ion guide chamber there is a burst of pressure followed by a steep decrease in pressure after the pulse of gas and ions is terminated, where the resultant pressure change in the ion guide chamber corresponds to a dynamic change in internal pressure. In some embodiments, introducing and releasing pulses of ions can cause the ions to separate according to the m/z of the ions. In some embodiments, methods as provided herein can include channeling and/or releasing at least a portion of the separated ions from the ion guide for transmission into a downstream mass analyzer.

In some embodiments, methods as provided herein can include introducing ions into an ion guide chamber via actuating, controlling, modulating, positioning, and/or switching the interface disposed between the ion source region and the ion guide chamber. In some embodiments, introducing ions can include actuating, controlling, modulating, positioning, and/or switching the valve of the interface disposed between the ion source region and the ion guide chamber between a closed state in which ions can be inhibited from entering the ion guide chamber and an opened state in which ions can pass from the ion source region to the ion guide chamber. In some embodiments, actuating, controlling, modulating, positioning, and/or switching between the closed state and the opened state can be repeated according to a predetermined cycle or pattern, a duty cycle. In some embodiments, actuating, controlling, modulating, positioning, and/or switching between the closed state and the opened state can induce a burst of pressure when the valve is in the opened state followed by a decrease in pressure when the valve is in the closed state. In some embodiments, modulating the valve creates the dynamic change in the mass spectrometry system and in particular, the ion guide chamber.

In some embodiments, methods can include maintaining the vacuum of the vacuum chambers housing the mass analyzer at a pressure, for example, at about $5\times10^{-3}$ Torr, about $5\times10^{-5}$, or less. In some embodiments, methods can include maintaining the vacuum chamber at a pressure that is less than that of the upstream ion guide chamber. In some embodiments, methods can include maintaining the ion guide chamber at a pressure, for example, at about $5\times10^{-3}$ Torr, about $5\times10^{-5}$, or less.

In some embodiments, methods can include applying an RF voltage to at least one rod of an ion guide having a plurality of rods. In some embodiments, applying an RF voltage to at least one rod of an ion guide having a plurality of rods can induce radial confinement of ions in the ion guide.

In some embodiments, methods of separating ions in a mass spectrometry system include steps of introducing one or more pulses of gas having entrained ions into the ion guide chamber so as to cause a dynamic pressure change in the ion guide. In some embodiments, the internal pressure of an ion guide chamber increases as a pulse of gas and ions enters the ion guide and decreases after a pulse of gas and ions is terminated. In some embodiments, generating such a dynamic change in internal pressure in the ion guide chamber can cause a separation of at least a portion ions of the ion guide based on their m/z ratios. In some embodiments, methods can include adjusting the pressure regime of the ion source region, the ion guide chamber, and the vacuum chamber to affect the dynamic change in internal pressure in the ion guide chamber. In some embodiments, methods can include adjusting the period of time that an interface and/or valve disposed between in the opened state and/or the closed state to affect the dynamic change in internal pressure in the ion guide chamber. In some embodiments, an interface includes an opening that leads to an inlet segment to a valve and through an outlet segment to an exit.

In some embodiments, methods include adjusting ion channeling or confinement using ion guide parameters as known in the art. In some embodiments, methods of enhancing and/or discriminating ions can include selecting a desired m/z ratio, m/z ratios, or m/z ratios in a range. In some embodiments, methods can include identifying an arrival time for a desired m/z ratio, m/z ratios, or m/z ratios in a range for a particular set of pressure regime characteristics and ion guide characteristics for the mass spectrometry system. In some embodiments, methods can include enhancing a relative intensity of ions released from an ion guide in a desired m/z range. In some embodiments, methods can include controlling an ion guide to cause release of at least a portion of ions to the downstream mass analyzer. In some embodiments, a dynamic change in internal pressure coupled with controlling the release of ions can generate separation of ions. In some embodiments, methods can include reducing transmission of unwanted ions to downstream ion optics. In some embodiments, unwanted ions from an ion source that enter an ion guide chamber are attenuated, cut off, filtered or removed before reaching downstream mass spectrometry system components. In some embodiments, less than about 1% of ions received from an ion source to about 20% of ions received from an ion source are transmitted downstream.

In some embodiments, methods of reducing contamination in a mass spectrometry system can include providing a mass spectrometry system as disclosed herein. In some embodiments, methods can include identifying a desired m/z range. In some embodiments, methods include enhancing and/or discriminating the relative intensity of ions released from the ion guide in the desired m/z range and reducing transmission of unwanted ions to downstream ion optics.

The foregoing and other advantages, aspects, embodiments, features, and objects of the present disclosure will become more apparent and better understood by referring to the following detailed description when read in connection with the accompanying drawing.

BRIEF DESCRIPTION OF THE DRAWING

A person of ordinary skill in the art will understand that the drawing, described below, is for illustration purposes only. The figures of the drawing are not intended to limit the scope of the Applicant's teachings in any way. It is emphasized that, according to common practice, various features of the drawing are not to scale. On the contrary, the dimensions of the various features are or may be arbitrarily expanded or reduced for clarity. Included in the drawing are the following Figs..

DEFINITIONS

Figure 1:
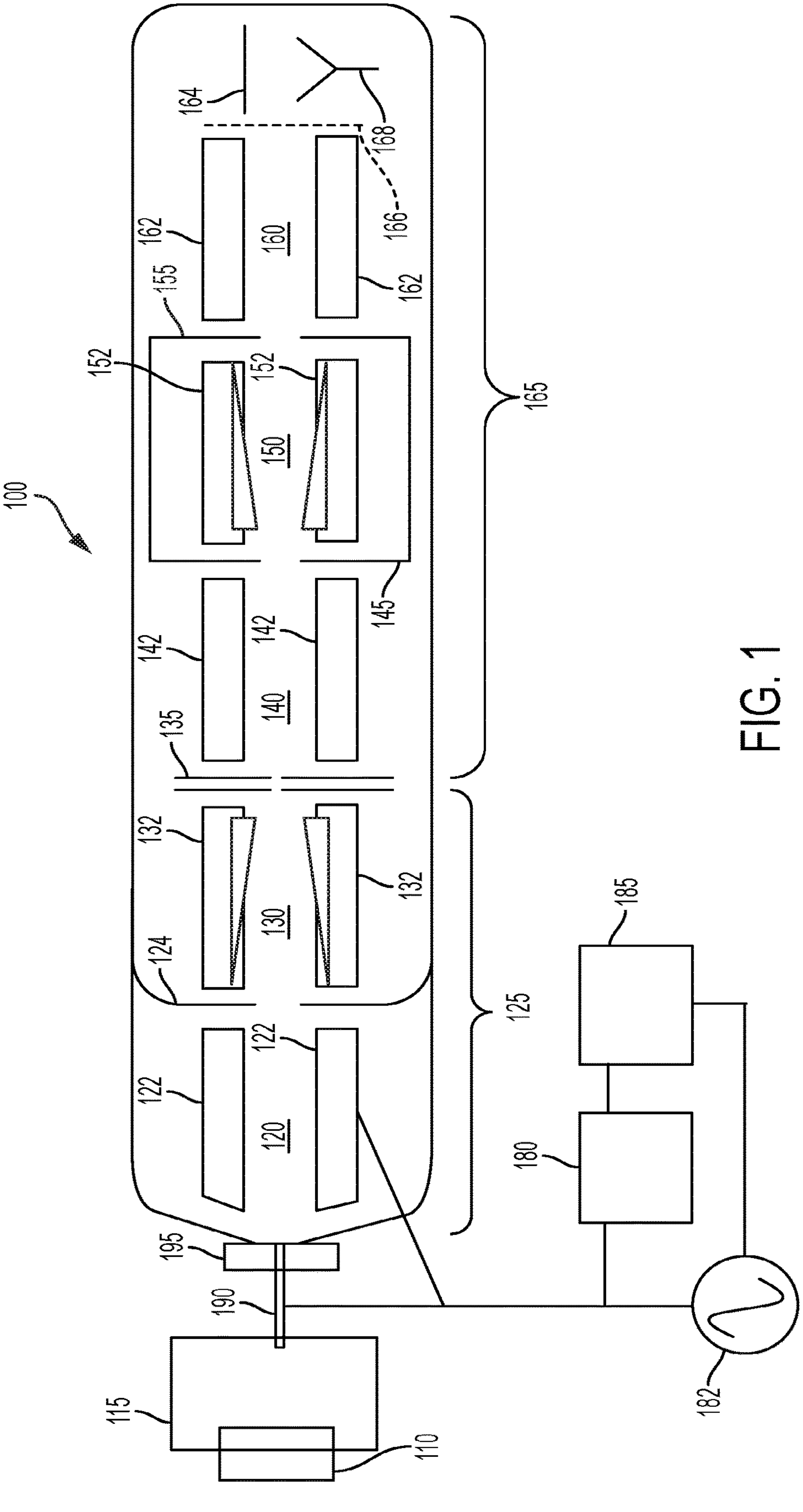
FIG. 1, in a schematic diagram, illustrates a QTRAP® QqQ mass spectrometry system in accordance with one aspect of various embodiments of the present disclosure.

Various terms relating to aspects of the present disclosure are used throughout the specification and claims. Such terms are to be given their ordinary meanings in the art, unless otherwise indicated. In order for the present disclosure to be more readily understood, certain terms are first defined below. Additional definitions for the following terms and other terms are set forth throughout the specification.

As used herein, the terms "about", "approximately", and "substantially", refer to variations in a numerical quantity that can occur, for example, through measuring or handling procedures in the real world; through inadvertent error in these procedures; through differences/faults in the manufacture of electrical elements; through electrical losses; as well as variations that would be recognized by a person of ordinary skill in the art as being equivalent so long as such variations do not encompass known values practiced by the prior art. Whether or not modified by the term "about", "approximately", or "substantially", quantitative values recited in the claims include equivalents to the recited values, e.g., variations in the numerical quantity of such values that can occur, but would be recognized to be equivalents by a person skilled in the art.

As used herein, unless otherwise clear from context, the term "a" may be understood to mean "at least one." As used in this application, the term "or" may be understood to mean "and/or." In this application, the terms "comprising" and "including" may be understood to encompass itemized components or steps whether presented by themselves or together with one or more additional components or steps. Unless otherwise stated, the terms "about" and "approximately" may be understood to permit standard variation as would be understood by those of ordinary skill in the art. Where ranges are provided herein, the endpoints are included. As used in this application, the term "comprise" and variations of the term, such as "comprising" and "comprises," are not intended to exclude other additives, components, integers or steps.

As used herein, the terms "about" and "approximately" are used as equivalents. Any numerals used in this application with or without about/approximately are meant to cover any normal fluctuations appreciated by one of ordinary skill in the relevant art. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value). For example, if the term "about" means greater or lesser than the value or range of values stated by 1/10 of the stated value, e.g., ±10%, then applying a voltage of about +3V DC to an element can mean a voltage between +2.7V DC and +3.3V DC.

As used herein, the term "substantially" refers to a qualitative condition of exhibiting total or near-total extent or degree of a characteristic or property of interest. One of ordinary skill in the art will understand that electrical properties rarely, if ever, go to completion and/or proceed to completeness or achieve or avoid an absolute result. Substantially is therefore used herein to capture a potential lack of completeness inherent therein. Values may differ in a range of values within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than). For example, values may differ by 5%.

DETAILED DESCRIPTION

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

Because ionization at atmospheric pressure (e.g., by chemical ionization, electrospray) can be a highly efficient means of ionizing molecules within a sample, ions of an analyte of interest as well as interfering/contaminating ions and neutral molecules can be created in high abundance. Transmission of a higher abundance of undesired ions and neutral molecules can foul/contaminate downstream elements, which can adversely affect their performance and stability. Additionally, such transmission can lead to loss of signal and/or a low signal-to-noise ratio, thereby interfering with mass spectrometric analysis. These results can lead to increased costs and/or decreased throughput necessitated by acquisition and analysis of additional data and/or by more frequent cleaning of critical components within the high-vacuum chamber(s).

As discussed below in more detail, in some embodiments, mass spectrometry systems are disclosed herein. In some embodiments, the mass spectrometry system can include an ion source, an ion guide, an interface that is disposed between the ion source and the ion guide, and a mass analyzer that is housed in a vacuum chamber that is downstream of both the ion source and the ion guide. The present disclosure encompasses a recognition that varied vacuum and pressure level arrangements, configurations, and regimes for chambers of provided mass spectrometry system when used in conjunction with discrete application of RF and/or DC voltages to the quadrupole rods can provide certain advantages. For example, in some embodiments, the interface or a valve disposed between the ion source region and the ion guide chamber can actuate, control, and/or modulate transmission of ions formed in the ion source. In some embodiments, the valve can be configured to be in a closed state in which the pressure can be high and/or increasing on the ion source region side of the valve and which the pressure can be low and/or decreasing on the ion guide chamber side. In some embodiments, the interface can be in the opened state so that the pressure in the ion guide chamber quickly rises, for example, in a pressure burst as ions move through the opening in the interface from the higher pressure ion source side to lower pressure ion guide chamber side. In some embodiments, the valve can be configured to be actuated, controlled, and/or modulated to the closed state after a period of time in the opened state, in which the pressures can again return to be high and/or increasing on the ion source region side of the valve and low and/or decreasing on the ion guide chamber side. In some embodiments, the present disclosure encompasses a recognition that a quick rise in pressure followed by a quick drop in pressure in the ion guide chamber side of the valve causes the ions that pass through the valve to separate according to their m/z ratios. In some embodiments, the separation is detectable at a downstream mass analyzer. In some embodiments, the separation of the ions can be characterized by different arrival times of ions having different m/z ratios at the downstream mass analyzer. In some embodiments, the arrival times of ions having different m/z ratios can accordingly be used to separate these ions. By way of example, in some embodiments, the m/z separation of the ions that is created can be used in conjunction with the ion guide to select and isolate ions having a desired m/z ratio or m/z ratios within a desired range based on channeling and/or transmitting ions having a particular arrival time or an arrival time within a particular range and discriminating against other ions.

Mass Spectrometry Systems

While systems, devices, and methods described herein can be used in conjunction with many different mass spectrometry systems, an exemplary mass spectrometry system 100 for such use is illustrated schematically in FIG. 1. It should be understood that mass spectrometry system 100 represents only one possible mass spectrometry system for use in accordance with embodiments of systems, devices, and methods described herein. Moreover, other mass spectrometry systems having other configurations can all be used in accordance with the systems, devices and methods described herein as well.

As shown schematically in the exemplary embodiment depicted in FIG. 1, the mass spectrometry system 100 generally includes a QTRAP® Q-q-Q hybrid linear ion trap mass spectrometry system, as generally described in an article entitled "Product ion scanning using a Q-q-$Q_{linear}$ ion trap (Q TRAP®) mass spectrometer," authored by James W. Hager and J. C. Yves Le Blanc and published in Rapid Communications in Mass Spectrometry (2003; 17: 1056-1064), which is hereby incorporated by reference in its entirety, and modified in accordance with various aspects of the present teachings. Other non-limiting, exemplary mass spectrometry systems that can be modified in accordance with the systems, devices, and methods disclosed herein can be found, for example, in U.S. Pat. No. 7,923,681, entitled "Collision Cell for Mass Spectrometer," which is hereby incorporated by reference in its entirety. Other configurations, including but not limited to those described herein and others known to those skilled in the art, can also be utilized in conjunction with the systems, devices, and methods disclosed herein.

Ion Sources

As shown in FIG. 1, the exemplary mass spectrometry system 100 can include an ion source 110 disposed in or adjacent to an ion source region 115. The ion source 110 can be any known or hereafter developed ion source for generating ions and modified in accordance with the present teachings. Non-limiting examples of ion sources suitable for use with the present teachings include atmospheric pressure chemical ionization (APCI) sources, electrospray ionization (ESI) sources, continuous ion source, a pulsed ion source, an inductively coupled plasma (ICP) ion source, a matrix-assisted laser desorption/ionization (MALDI) ion source, a glow discharge ion source, an electron impact ion source, a chemical ionization source, or a photo-ionization ion source, among others. In some embodiments, an ion source region is or can be maintained at a pressure near atmospheric pressure.

Ion Guides

The mass spectrometry system 100 can further include a first ion guide 122 (e.g., Qjet® of SCIEX) that can be housed in a first ion guide chamber 120 and a second ion guide 132 (e.g., Q0) that can be housed in a second ion guide chamber 130. The first and second RF ion guides can be included in an upstream section 125 of the mass spectrometry system 100. The first and second ion guides 122 and 132 can be separated by an aperture lens 124 (e.g., IQ0).

In some embodiments, for example, the first ion guide 122 and the second RF ion guide can be used to capture and focus ions using a combination of gas dynamics and radio frequency fields. The upstream section 125 can be configured to operate as an inclusive and/or unified vacuum chamber or as individual chambers 120 and 130 within the upstream section 125. In some embodiments, it will also be appreciated that the exemplary first and second ion guides 122 and 132 as disclosed herein can be disposed in a variety of locations in the upstream section 125 of the mass spectrometry system 100. In some embodiments, for example, the first ion guide 122 can serve in the conventional role of a QJet® ion guide (e.g., operated at a pressure of about 1-10 Torr) and the second ion guide 132 can serve as the Q0 focusing ion guide (e.g., operated at a pressure of about 2-15 mTorr) preceded by a QJet® ion guide The vacuum chamber of the upstream section 125 of the mass spectrometry system 100, within which the ion guides 122 and 132 are housed, can be associated with a mechanical pump (not shown) operable to evacuate the region 120 to a pressure of about 1-10 Torr. The region 130 is evacuated by a small turbomolecular pump to chamber to a pressure suitable to provide collisional cooling of about 2-15 mTorr.

Interfaces and Pressure Regimes

Figure 2:
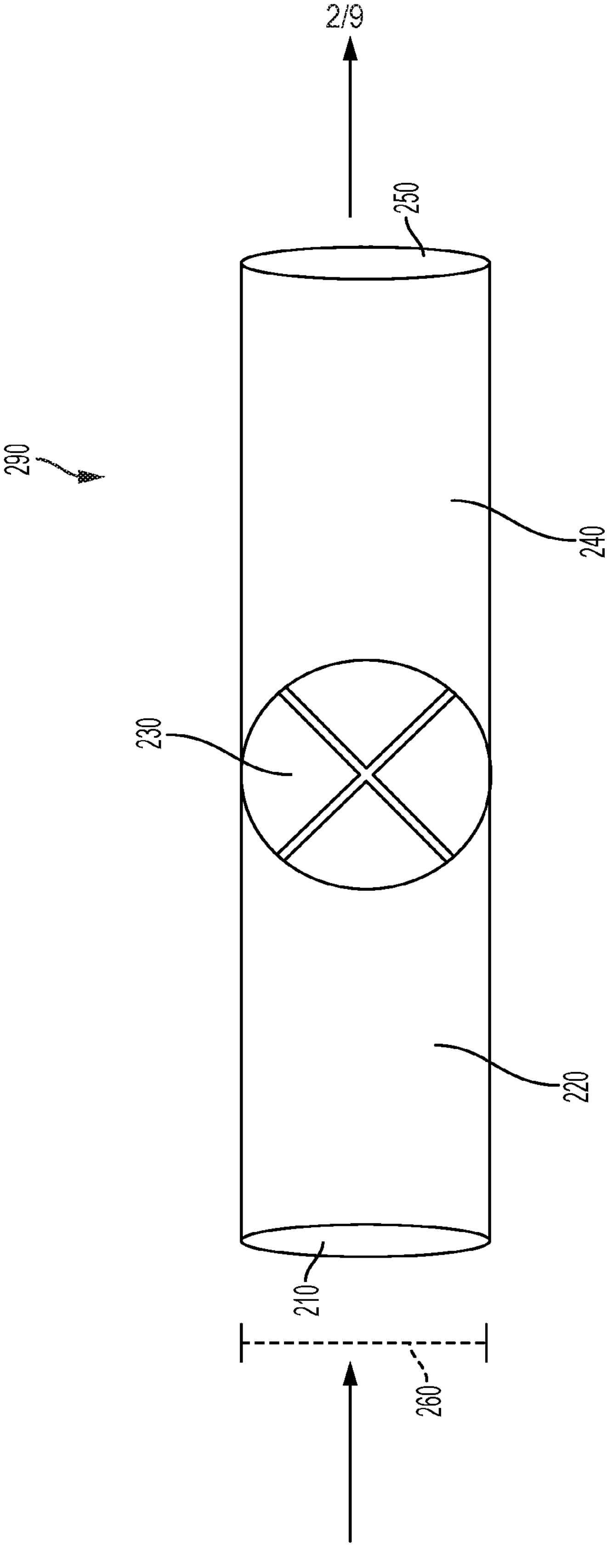
FIG. 2, in a schematic diagram, illustrates an interface of the present disclosure.

In some embodiments, as shown in FIG. 1, the mass spectrometry systems 100 can include an interface 190 disposed between the ion source region 115 and the first ion guide chamber 120. With reference to FIG. 2, the interface 290 can include an opening 210, an inlet 220, a valve 230, an outlet 240, and an exit 250. In some embodiments, the interface can have an internal cross-section and/or diameter 260. In some embodiments, ions can enter the interface at the opening 210. In some embodiments, the opening 210, an inlet 220, a valve 230, an outlet 240, and an exit 250 can have an internal cross-section and/or diameter 260 of about 0.1 mm to about 0.7 mm. In some embodiments, the opening 210, an inlet 220, a valve 230, an outlet 240, and an exit 250 can have an internal cross-section and/or diameter 260 of about 0.32 mm. In some embodiments, the opening 210, an inlet 220, a valve 230, an outlet 240, and an exit 250 can have an internal cross-section and/or diameter 260 of about 0.1 mm; about 0.11 mm; about 0.12 mm; about 0.13 mm; about 0.14 mm; about 0.15 mm; about 0.16 mm; about 0.17 mm; about 0.18 mm; about 0.19 mm; about 0.2 mm; about 0.21 mm; about 0.22 mm; about 0.23 mm; about 0.24 mm; about 0.25 mm; about 0.26 mm; about 0.27 mm; about 0.28 mm; about 0.29 mm; about 0.3 mm; about 0.31 mm; about 0.32 mm; about 0.33 mm; about 0.34 mm; about 0.35 mm; about 0.36 mm; about 0.37 mm; about 0.38 mm; about 0.39 mm; about 0.3 mm; about 0.41 mm; about 0.42 mm; about 0.43 mm; about 0.44 mm; about 0.45 mm; about 0.46 mm; about 0.47 mm; about 0.48 mm; about 0.49 mm; about 0.5 mm; about 0.51 mm; about 0.52 mm; about 0.53 mm; about 0.54 mm; about 0.55 mm; about 0.56 mm; about 0.57 mm; about 0.58 mm; about 0.59 mm; about 0.6 mm; about 0.61 mm; about 0.62 mm; about 0.63 mm; about 0.64 mm; about 0.65 mm; about 0.66 mm; about 0.67 mm; about 0.68 mm; about 0.69 mm; or about 0.70 mm.

With reference to FIG. 1, the interface 190 can be configured to be coupled to the ion source region in an upstream direction. In some embodiments, the interface 190 is elongated, for example, it can have a cylindrical shape. The interface 190 can be mounted to the first ion guide chamber 120 by a mounting snout 195. In some embodiments, the interface 190 can include a valve that can be disposed between the ion source region 115 and the first ion guide chamber 120. In some embodiments, for example, the valve of the interface 190 can include a solid plate. In some embodiments, the valve of the interface can be the walls of the elongated interface, for example, the walls can be configured to be compressible. In some embodiments, the valve of the interface 190 can be a pinch valve can include a compressible tube configured to impede passage of ions from the ion source region to the ion guide chamber. In some embodiments, the valve of the interface 190 could be a Discontinuous Atmospheric Pressure Interface (DAPI). In some embodiments, the DAPI can be designed and configured to directly introduce (e.g., spray, jet, and/or nanospray) or allow introduction of ions into the ion guide chamber. In some embodiments, the valve of the interface 190 can be actuated, controlled, modulated, positioned, and/or switched by a voltage applied to the interface 190, for example, a DC voltage of about 2 V to about 60 V under control of a controller 185. In some embodiments, the DC voltage applied to the interface that can cause the valve of the interface to actuate to an open state is about 24 V.

In some embodiments, the interface 190 is configured to fluidly connect the ion source region 115 and the first ion guide chamber 120. In some embodiments, the interface 190 is configured to allow gas, ions, and neutrals to freely move from the ion source region 115 through the interface 190 and into the first ion guide chamber 120. In some embodiments, the interface 190 is configured to substantially inhibit the flow of any gas, ions, and neutrals from the ion source region 115 through the interface 190 and into the first ion guide chamber 120 when in a closed state. By way of example, the interface 190 can be configured to control, modulate, and/or regulate transmission of ions that are generated at the ion source 110 from reaching the first or second ion guide chambers 120 and 130. In some embodiments, the interface 190 can include a valve that can be configured and/or positioned in one of a plurality of states. In some embodiments, the plurality of states can include a closed state, an opened state, and/or various states in between a fully closed state and a fully opened state. In some embodiments, for example, in which the valve is in the opened state, the ion source region 115 can be fluidly connected to the first ion guide chamber 120. In some embodiments, for example, in which the valve is in the closed (i.e. a substantially sealed) state, the ion source region is mechanically disconnected and/or fluidly isolated from the ion guide chamber.

An ion source region 115 is typically held at or near atmospheric pressure. For example, a pressure of the ion source region 115 can be in a range of about 800 Torr to about 500 Torr. By way of non-limiting example, the pressure in the first ion guide chamber can be maintained at an average pressure of about 2.5 Torr or about 1 Torr to about 10 Torr. By way of example, in some embodiments, when the valve of the interface 190 is in a closed state, the pressure in the upstream section 125 can be decreased to less than about $5\times10^{-3}$ Torr (e.g., about $1\times10^{-4}$ Torr). In some embodiments, a pressure of the first and second ion guide chambers 120 and 130 can be greater than about $5\times10^{-3}$ Torr (e.g., about up to about 5 Torr) when the valve of the interface 190 is in an opened state. In some embodiments, the present disclosure encompasses a recognition that a dynamic change in pressure (e.g., a rapid change between low and high pressures) within the first and second ion guide chambers 120 and 130 can cause beneficial results. In some embodiments, the valve of the interface 190 is actuated, controlled, and/or modulated to the opened state, in which ions can pass through the interface and be received by the first ion guide chamber 120. In some embodiments, the received ions can expand in the vacuum of ion guide chamber 120 as a result of the pressure differential on either side of the interface valve 190. In some embodiments, the pressure in the first ion guide chamber will rapidly fluctuate between these low and high pressure levels and values as the valve of the interface 190 is switched between the opened state and the closed state. In some embodiments, the rapid pressure fluctuation results in conditions of dynamic change in the mass spectrometry system 100.

In some embodiments, the first ion guide 122 (e.g., QJet®) is configured to transfer ions received from the ion source region 115 to downstream ion optics. In some embodiments, ions are channeled and/or transferred to the second ion guide 132 (e.g., Q0) through the aperture lens 124 (e.g., IQ0) disposed therebetween. The second ion guide 132 channels and/or transfers at least a portion of these ions through aperture lens 135 (e.g., IQ1) disposed between the upstream section 125 and the downstream section 165 of system 100.

Mass Analyzers

One or more mass analyzers 142 (e.g., Q1), 152 (e.g., Q2), and 162 (e.g., Q3) can be housed within a downstream section 165 of the mass spectrometry system 100. It will be appreciated that though the exemplary downstream vacuum chamber 165 is shown to have three mass analyzers (i.e., elongated rod sets 142, 152, and 162) more or fewer mass analyzer elements can be included in mass spectrometry systems in accordance with the present disclosure. For convenience, mass analyzers 142 (e.g., Q1), 152 (e.g., Q2), and 162 (e.g., Q3) can include elongated rod sets, for example, quadrupole rod sets including four rods arranged in a quadrupole configuration, though the elongated rod sets can be any other suitable multipole configurations, for example, hexapoles, octapoles, etc. It will also be appreciated that the one or more mass analyzers can be any of triple quadrupoles, linear ion traps, quadrupole time of flights, Orbitrap or other Fourier transform mass spectrometry systems, all by way of non-limiting example. The downstream section 165 can be configured to operate as a single vacuum chamber.

The mass analyzers, 142, 152, and 162 are depicted as separated by aperture lenses 145 (e.g., IQ2) and 155 (e.g., IQ3) having an opening therethrough. The aperture lenses 145 (e.g., IQ2) and 155 (e.g., IQ3), can be configured to actively channel ions through the opening. Aperture lens 145 is depicted as positioned between mass analyzer 142 and mass analyzer 152. Aperture lens 155 is depicted as positioned between mass analyzer 152 and mass analyzer 162. Mass analyzers 142, 152, and 162 can be disposed in adjacent chambers 140, 150, and 160 respectively. Downstream section 165 housing mass analyzers 142, 152, and 162 can be evacuated to sub-atmospheric pressures as is known in the art. By way of example, a mechanical pump (e.g., a turbo-molecular pump) can be used to evacuate the vacuum chambers to appropriate pressures.

In some embodiments, a set of stubby rods (not shown) can also be provided between neighboring pairs of quadrupole rod sets (e.g., between 132 and 142 and between 142 and 152) to facilitate the transfer of ions between quadrupole rod sets. The stubby rods can serve as a Brubaker lens and can help minimize interactions with any fringing fields that may have formed in the vicinity of an adjacent lens, for example, if the lens is maintained at an offset potential.

The downstream section 165 can further include an exit lens 166, a deflector 164, and a detector 168. The exit lens 166 can be positioned between mass analyzer 162 (e.g., Q3) and the detector 168 to control ion flow into the detector 168.

Power Supplies and Controllers

As shown in FIG. 1, the exemplary mass spectrometry system 100 can additionally include one or more power supplies (e.g., RF power supply 182 and DC power supply 180) that can be controlled by a controller 185. FIG. 1 depicts the power supplies in direct communication with an interface 190 and the first ion guide 122. It will be appreciated that the one or more power supplies 180 and 182 that can be controlled by controller 185 so as to apply electric potentials with RF, AC, and/or DC components, for example, to quadrupole rods, various lenses, auxiliary electrodes, and/or the interface 190 to configure the elements of the mass spectrometry system 100 for various different modes of operation depending on the particular application. It will be further appreciated that the controller 185 can also be linked to the various elements in order to provide joint control over the executed timing sequences. Accordingly, the controller 185 can be configured to provide control signals to the power source(s) supplying 180 and 182 the various components in a coordinated fashion in order to control the mass spectrometry system 100 as otherwise discussed herein.

During operation of the mass spectrometry system 100, pulsed ions, neutrals, and other gas can be generated by the ion source 110. These generated ions under typical mass spectrometry conditions could be extracted and introduced into the conventional QTRAP® instrument. Ions and neutrals can be generated by the ion source 110. The valve of the interface 190 can be configured to be actuated, controlled, modulated, positioned, and/or switched to the closed state or the opened state. When the interface is actuated, controlled, modulated, positioned, and/or switched to the closed state, the generated ions populate the ion source region 115 side of the valve of the interface. The internal pressures of the first and second ion guide chambers 120, 130 and the downstream section 165 are below the pressure that would exist when under conventional operation. When the interface is actuated, controlled, modulated, positioned, and/or switched to the opened state, the gas, ions, and neutrals populating the ion source region 115 rapidly diffuse into the first ion guide chamber 120 via the interface 190 and lead to a rapid rise in internal pressures therein, that is a burst of ions and neutral molecules enter the first ion guide chamber 120 and increase its internal pressure. After the pulse is dissipated, the internal pressure of the first ion guide chamber 120 decreases. The present disclose encompasses a recognition that such modulation of the internal pressure of the first ion guide chamber 120 can separate ions according to their m/z ratios. These ions pass through the valve of the interface 190, enter the first ion guide chamber 120, traverse one or more additional vacuum chambers and/or quadrupoles of the second ion guide chamber 130. Through these stages, the ions form a coherent ion beam, which can provide additional focusing of and finer control over the ion beam using a combination of gas dynamics and radio frequency fields. In some embodiments, the first ion guide 122 (e.g., QJet®) transfers ions received thereby to subsequent ion optics such as the second ion guide 132 (e.g., Q0) through the aperture lens 124 (e.g., IQ0) disposed therebetween. The second ion guide 132 transports and delivers ions through the aperture lens 135 (e.g., IQ1) to the downstream section 165 of system 100, including for example the mass analyzers, 142, 152, and 162 and the detector 166.

After being transmitted from the second ion guide chamber 130, the m/z separated ions can enter the adjacent quadrupole rod set 142 (e.g., Q1), which can be situated in a vacuum chamber of the downstream section 165 that can be evacuated to a pressure that can be maintained at a value that is lower than that of second ion guide chamber 130 and the vacuum chamber of the upstream section 125 of the mass spectrometry system 100. By way of non-limiting example, the vacuum chamber of the downstream section 165 can be maintained at a pressure less than about $5\times10^{-3}$ Torr (e.g., about $5\times10^{-5}$ Torr), though other pressures can be used for this or for other purposes. As will be appreciated by a person of skill in the art, the quadrupole rod set 142 (e.g., Q1) can be operated as a conventional transmission RF/DC quadrupole mass filter that can be operated to select an ion of interest and/or a range of ions of interest. By way of example, the quadrupole rod set 142 (e.g., Q1) can be provided with RF/DC voltages suitable for operation in a mass-resolving mode. In some embodiments, taking the physical and electrical properties of 142 (e.g., Q1) into account, parameters for an applied RF and DC voltage can be chosen so that 142 (e.g., Q1) establishes a transmission window specific to the selected m/z ions, such that these ions can traverse 142 (e.g., Q1) largely unperturbed. Ions having m/z ratios falling outside the window, however, do not attain stable trajectories within the quadrupole and can be prevented from traversing the quadrupole rod set 142 (e.g., Q1). It should be appreciated that this mode of operation is but one possible mode of operation for Q1. By way of example, the aperture lens 145 (e.g., IQ2) between 142 (e.g., Q1) and 152 (e.g., Q2) can be maintained at a much higher offset potential than 142 (e.g., Q1) such that the quadrupole rod set 142 (e.g., Q1) can be operated as an ion trap. In such a manner, the potential applied to the entry lens 152 (e.g., Q2) can be selectively lowered (e.g., mass selectively scanned) such that ions trapped in 142 (e.g., Q1) can be accelerated into 152 (e.g., Q2), which could also be operated as an ion trap, for example.

Ions passing through the quadrupole rod set 142 (e.g., Q1) can pass through the lens 145 (e.g., IQ2) and into the adjacent quadrupole rod set 152 (e.g., Q2), which as shown can be disposed in a pressurized compartment and can be configured to operate as a collision cell at a pressure approximately in the range of from about 1 mTorr to about 10 mTorr, though other pressures can be used for this or for other purposes. A suitable collision gas (e.g., nitrogen, argon, helium, etc.) can be provided by way of a gas inlet (not shown) to thermalize and/or fragment ions in the ion beam. In some embodiments, application of suitable RF/DC voltages to the quadrupole rod set 152 (e.g., Q2) and entrance and exit lenses 145 (e.g., IQ2) and 155 (e.g., IQ3) can provide optional mass filtering.

Ions that are transmitted by 152 (e.g., Q2) can pass into the adjacent quadrupole rod set 162 (e.g., Q3), which is bounded upstream by 155 (e.g., IQ3) and downstream by the exit lens 166. As will be appreciated by a person skilled in the art, the quadrupole rod set 162 (e.g., Q3) can be operated at a decreased operating pressure relative to that of 152 (e.g., Q2), for example, less than about $5\times10^{-3}$ Torr (e.g., about $5\times10^{-5}$ Torr), though other pressures can be used for this or for other purposes. As will be appreciated by a person skilled in the art, 162 (e.g., Q3) can be operated in a number of manners, for example as a scanning RF/DC quadrupole or as a linear ion trap. Following processing or transmission through 162 (e.g., Q3), the ions can be transmitted into the detector 164 through the exit lens 166. The detector 164 can then be operated in a manner known to those skilled in the art in view of the systems, devices, and methods described herein. As will be appreciated by a person skill in the art, any known detector, modified in accord with the teachings herein, can be used to detect the ions.

Dynamic Change

With reference to FIG. 1, the interface 190 can be used to modulate the internal mass spectrometry system pressures, particularly in the first ion guide chamber 120. The interface can be configured to be actuated, controlled, modulated, positioned, and/or switched, e.g., periodically between a closed state in which it inhibits the transmission of ions from the ion source to the first ion guide chamber 120 and an opened state in which it allows the transmission of ions from the ion source to the first ion chamber 120. When positioned in the closed state, the internal pressures of the first and second ion guide chambers 120, 130 and the downstream section 165 are below the pressure that would exist when under conventional operation of a mass spectrometry system 100. By way of example, when positioned in the closed state, the internal pressures of the first and second ion guide chambers 120, 130 and the downstream section 165 are about $1\times10^{-4}$ Torr to about $1\times10^{-5}$ Torr. By way of example, a typical operating pressure of the first and second ion guide chambers 120 is about 1-10 Torr, and 130 is about $2\times10^{-3}$ Torr to about $15\times10^{-3}$ Torr and typical operating pressure of the downstream section 165 housing the mass analyzers is about $1\times10^{-5}$ Torr to about $5\times10^{-5}$ Torr. When the interface is actuated, controlled, modulated, positioned, and/or switched to the opened state, the gas, ions, and neutrals populating the ion source region 115 rapidly diffuse into the first ion guide chamber 120 via the interface 190 and lead to a rapid rise in internal pressures, that is a burst of ions and neutrals can be rapidly introduced to the ion guide chambers 120, 130 increasing the internal pressure. When the interface valve 190 is actuated, controlled, modulated, positioned, and/or switched again to the closed state the internal pressures return back to a lower pressure value, that is the pressure can return to that below the pressure that would exist when under conventional operation. Pressure will behave at a rate that is dependent on pumping speeds and conductances. By way of example, when positioned in the opened state, the internal pressures of the first ion guide region 120 is about 5 Torr to 50 Torr and the internal pressures of the second ion guide chambers 130 is about $1\times10^{-4}$ Torr to about $15\times10^{-4}$ Torr and the downstream section 165 are about $1\times10^{-4}$ Torr to about $15\times10^{-4}$ Torr. Below Table 1 provides a representative summary of these values with the above configurations.

TABLE 1

| Region | Interface Valve Opened Pressure (Torr) | Interface Valve Closed Pressure (Torr) (minimum) | (Comparison to Typical Operating Conditions) Pressure (Torr) |
|---|---|---|---|
| 120 | 5 - 50 | $1 \times 10^{-4}$ | 1 - 10 |
| 130 | $10 - 15 \times 10^{-3}$ | $1 \times 10^{-5}$ | $2 - 15 \times 10^{-3}$ |
| 165 | $1 - 15 \times 10^{-4}$ | $0.5 - 2 \times 10^{-5}$ | $1 - 5 \times 10^{-5}$ |

The controller can be used to cause the internal pressure to quickly fluctuate from a lower pressure value to a higher-pressure value. By way of example, the controller 185 can signal the power supply 180 to apply a DC voltage to the interface 190 to actuate the valve of the interface 190 from a closed state to an opened state in a repeating pattern. The controller can be configured according to a signal that applies the DC voltage to the valve of the interface for a first period of time so that the valve of the interface is in an opened state for the first period of time. The pressure in the ion guide chamber is at a lower pressure (e.g., below the pressure that would exist when under conventional operation) when the valve of the interface 190 is in a closed state, followed by a quick burst when the interface valve 190 is actuated, controlled, modulated, positioned, and/or switched to the opened state, in which the burst of ions, neutral and gas expands into the first ion guide chamber to raise its pressure to about 5 Torr to about 50 Torr (e.g., above the pressure that would exist when under conventional operation) for a first period of time. The controller can be configured according to the signal then to remove the DC voltage from the valve of the interface for a second period of time so that the valve of the interface is in a closed state for the second period of time. When the valve of interface 190 is again actuated, controlled, modulated, positioned, and/or switched to the closed state the pressure returns to the lower pressure, for example, about $1\times10^{-4}$ Torr to about $1\times10^{-5}$ Torr (e.g., below the pressure that would exist when under conventional operation). By way of example, the pressure in the first ion guide chamber 120 could quickly rise from about $1\times10^{-4}$ Torr to about 5 Torr to about 50 Torr and then quickly back to about $1\times10^{-4}$ Torr about $1\times10^{-4}$ Torr to about $1\times10^{-5}$ Torr. Such a fluctuation in pressure produces conditions of dynamic change in internal pressure in the first ion guide chamber 120. In some embodiments, a fluctuation in pressure produces conditions of dynamic change in internal pressure throughout the mass spectrometry system 100. While not wishing to be bound to a specific theory, it is believed that these pressure fluctuations, particularly pressure changes in the first ion guide chamber 120 can cause an m/z separation of ions of the resultant ion beam, which is detectable in the mass spectrometry system 100.

In some embodiments, a duration of a first period of time where an interface is switched to an opened state to allow introduction of ions into an ion guide is about 1 ms; about 2 ms; about 3 ms; about 4 ms; about 5 ms; about 6 ms; about 7 ms; about 8 ms; about 9 ms; about 10 ms; about 11 ms; about 12 ms; about 13 ms; about 14 ms; about 15 ms; about 16 ms; about 17 ms; about 18 ms; about 19 ms; about 20 ms; about 21 ms; about 22 ms; about 23 ms; about 24 ms; about 25 ms; about 26 ms; about 27 ms; about 28 ms; about 29 ms; about 30 ms; about 31 ms; about 32 ms; about 33 ms; about 34 ms; about 35 ms; about 37 ms; about 38 ms; about 39 ms; about 40 ms; about 45 ms; about 50 ms; about 55 ms; about 60 ms; about 65 ms; about 70 ms; about 75 ms; about 80 ms; about 85 ms; about 90 ms; about 95 ms; or to at least about 100 ms.

In some embodiments, a duration of a second period of time where an interface is switched to a closed state to inhibit introduction of ions into an ion guide is about 25 ms; about 50 ms; about 75 ms; about 100 ms; about 125 ms; about 150 ms; about 175 ms; about 200 ms; about 225 ms; about 250 ms; about 275 ms; about 300 ms; 325 ms; about 350 ms; about 375 ms; about 400 ms; 425 ms; about 450 ms; about 475 ms; about 500 ms; 525 ms; about 550 ms; about 575 ms; about 600 ms; 625 ms; about 650 ms; about 675 ms; about 700 ms; 725 ms; about 750 ms; about 775 ms; about 800 ms; 825 ms; about 850 ms; about 875 ms; about 900 ms; 925 ms; about 950 ms; about 975 ms; about 1000 ms; 1025 ms; about 1050 ms; about 1075 ms; about 1100 ms; 1125 ms; about 1150 ms; about 1175 ms; about 1200 ms; 1225 ms; about 1250 ms; about 1275 ms; about 1300 ms; 1325 ms; about 1350 ms; about 1375 ms; about 1400 ms; 1425 ms; about 1450 ms; about 1475 ms; about 1500 ms; 1525 ms; about 1550 ms; about 1575 ms; about 1600 ms; 1625 ms; about 1650 ms; about 1675 ms; about 1700 ms; 1725 ms; about 1750 ms; about 1775 ms; about 1800 ms; 1825 ms; about 1850 ms; about 1875 ms; about 1900 ms; 1925 ms; about 1950 ms; about 1975 ms; or about 1000 ms.

When in constant operation, the average instrument internal pressures will also be determined by the opened state vs. closed state duty cycle of the interface valve 190. As noted above, the duty cycle can be expressed as the percentage of time in which the applied voltage maintains the interface valve in any of an open or closed state. In some embodiments, one or more controllers causes opening and closing of a valve at a duty cycle in a range of about 1% to about 20%. In some embodiments, one or more controllers causes opening and closing of a valve at a duty cycle in a range of about 20%; about 19%; about 18%; about 17%; about 16%; about 15%; about 14%; about 13%; about 12%; about 11%;

about 10%; about 9%; about 8%; about 7%; about 6%; about 5%; about 4%; about 3%; about 2%; about 1%; or about 0.5%.

Channeling of Separated Ions

In some embodiments, a dynamic change in internal pressure as discussed above can cause m/z separation which can in turn be used to enhance and/or discriminate ions according to their m/z ratios. Based on a particular pressure regime and its conditions and variable, the ion guides can be configured to detect separated m/z ions and enhance and/or discriminate against ions in a particular m/z range. Such enhancement and/or discrimination can result in improvement in signal-to-noise ratio and/or robustness of the mass spectrometry system 100. The first and second ion guides 122 (e.g., Qjet® of SCIEX) and 132 (e.g., Q0) can be configured to select and transmit ions in a coherent ion beam according to their m/z ratios. In some embodiments, the ion guides 122 and 132 can include quadrupole rods of a quadrupole rod set. In some embodiments, upon application of various RF and/or DC potentials, ions of interest are collisionally cooled (e.g., in conjunction with the pressure of vacuum chamber of the upstream section 125 of the mass spectrometry system 100) and transmitted into the downstream mass analyzers, 142, 152, and 162 for further processing and to the detector 166, while unwanted ions can be neutralized within the ion guides 122 and 132, thereby reducing a potential source of non-separated, non-selected ions, and/or reducing contamination and/or interference. For example, ions can be generated in an ion source 110 and transmitted through the interface 190. In accordance with the present disclosure, such ions can separate according to their m/z ratios. The ion guides of the mass spectrometry system 100 and in particular, the first ion guide 122 (e.g., Qjet® of SCIEX), can be operated to transmit m/z ions received from an ion source 110 and then separated into downstream mass analyzers for further processing, while preventing unwanted ions (e.g., non-selected/interfering/contaminating ions) from being transmitted into the downstream section 165 of the mass spectrometry system 100.

In some embodiments, one or more controllers is configured to adjust, control, or regulate an ion guide to transmit less than about 30% of ions received from an ion source; less than about 29% of ions received from an ion source; less than about 28% of ions received from an ion source; less than about 27% of ions received from an ion source; less than about 26% of ions received from an ion source; less than about 25% of ions received from an ion source; less than about 24% of ions received from an ion source; less than about 23% of ions received from an ion source; less than about 22% of ions received from an ion source; less than about 21% of ions received from an ion source; less than about 20% of ions received from an ion source; less than about 19% of ions received from an ion source; less than about 18% of ions received from an ion source; less than about 17% of ions received from an ion source; less than about 16% of ions received from an ion source; less than about 15% of ions received from an ion source; less than about 14% of ions received from an ion source; less than about 13% of ions received from an ion source; less than about 12% of ions received from an ion source; less than about 11% of ions received from an ion source; less than about 10% of ions received from an ion source; less than about 9% of ions received from an ion source; less than about 8% of ions received from an ion source; less than about 7% of ions received from an ion source; less than about 6% of ions received from an ion source; less than about 5% of ions received from an ion source; less than about 4% of ions received from an ion source; less than about 3% of ions received from an ion source; less than about 2% of ions received from an ion source; or less than about 1% of ions received from an ion source.

EXEMPLIFICATION

The following examples illustrate some embodiments and aspects of the present disclosure. It will be apparent to those skilled in the relevant art that various modifications, additions, substitutions, and the like can be performed without altering the spirit or scope of the disclosure, and such modifications and variations are encompassed within the scope of the disclosure as defined in the claims, which follow. The present disclosure will be more fully understood by reference to these examples. The following examples do not in any way limit the present disclosure or the claimed disclosures and they should not be construed as limiting the scope.

Figure 3:
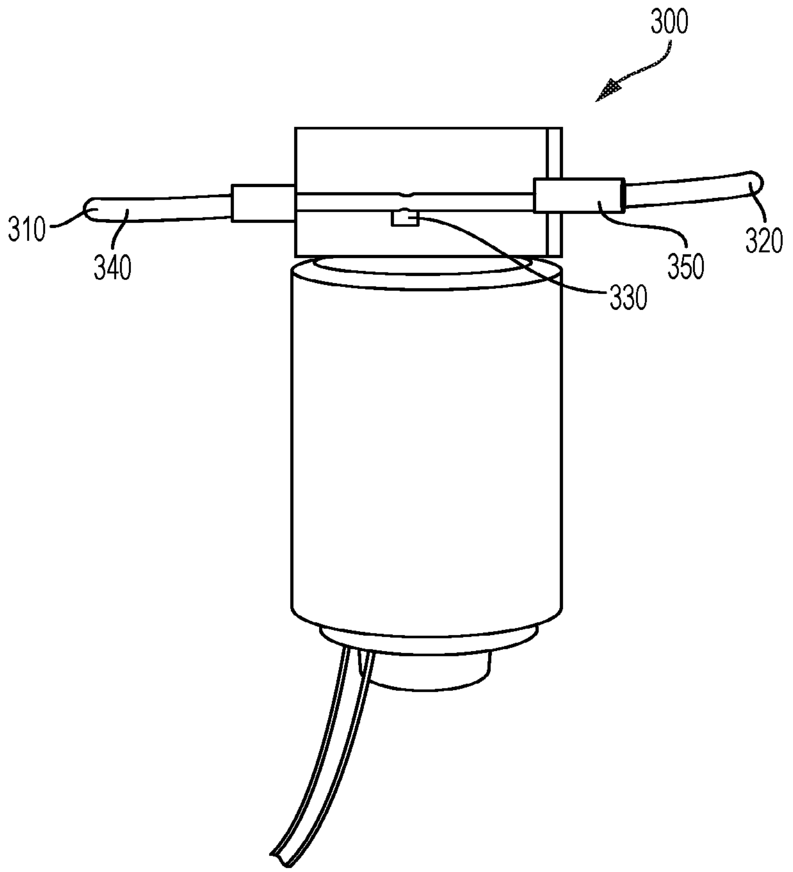
FIG. 3 depicts an exemplary prototype of a DAPI pinch valve, an interface of the present disclosure.

FIG. 3 depicts a Discontinuous Atmospheric Pressure Interface (DAPI) 300, (See Gao et al., 80 Anal. Chem, 4026-4032 (2008)). In some embodiments, the DAPI 300 can be operable to control transmission of ions from an ion source to an ion guide. In some embodiments, the DAPI 300 can be operable to control pressure from an ion source to an ion guide. The DAPI 300 can be mounted and fluidly connected to the first ion guide chamber 120 of FIG. 1. Ions and neutrals are introduced using the DAPI 300, which is essentially two in-line capillaries interrupted by a pinch valve. Traditionally, a DAPI is known to be useful for ion introduction into mass spectrometry systems having vacuum pumping systems with limited capacity. In such under-pumped systems, the DAPI can operate by switching between opened and closed states according to a duty cycle to adjust pressure so that mass analysis is possible.

In this embodiment, the DAPI 300 is cylindrical. In some embodiments, the DAPI 300 can include an opening 310, in which ions can enter the DAPI 300. In some embodiments, the opening 310 has an internal cross-section and/or diameter. In some embodiments, the opening 310 extends to an inlet 340. In some embodiments, the opening 310 of the DAPI 300 extends in an upstream direction and into an ion source region (not shown). In some embodiments, the DAPI 300 can further include an outlet 350 and an exit 320 that extends downstream into the ion guide chamber 120 (e.g., of FIG. 1, not shown). In some embodiments, the internal cross-section and/or diameter of the opening 310 and/or the exit 320 of the DAPI 300 is about 0.1 mm to about 0.7 mm. In some embodiments, the opening 310 and/or the exit 320 of the DAPI 300 has an internal cross-section and/or diameter of about 0.32 mm.

In this embodiment, the interface includes a pinch valve 330 that can be used to modulate the passage of ions and neutrals introduced into the interface and to downstream components. In some embodiments, the DAPI can be designed and configured to directly introduce or directly allow introduction of ions into the ion guide chamber. In some embodiments, the DAPI can be designed and configured to directly introduce or directly allow introduction of ions into the vacuum chamber containing the ion guide without the need for differential pumping. In some embodiments, the pinch valve 330 can include a compressible tube configured to impede passage of ions from the ion source region and the ion guide chamber.

Figure 4:
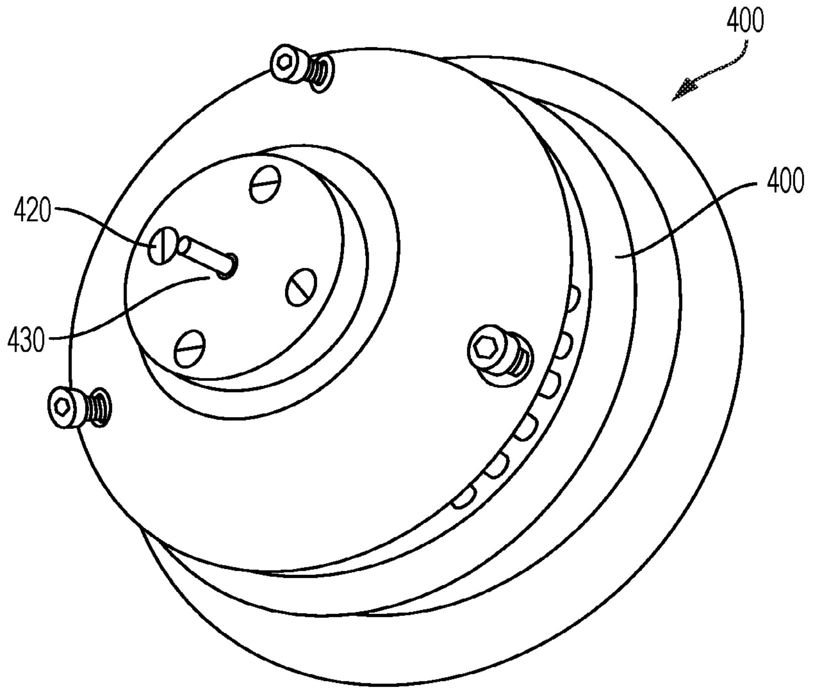
FIG. 4 depicts an exemplary prototype of a mounting snout.

FIG. 4 depicts a mounting snout 400 that can be used for mounting, connecting and/or attaching and interface 190 (as shown in FIG. 1), for example a DAPI 300 (as shown in FIG.

3) to an ion guide chamber. The mounting snout 400 can include a flange 410 to attach the mounting snout 400 to a front surface of an ion guide chamber. In some embodiments, for example, the flange 410 can include an O-ring surface or a knife edge surface that can create or form a seal between the mounting snout and the front surface of the ion guide chamber. The mounting snout 400 can include an inlet 430. In some embodiments, the inlet 430 can include an opening 420 therethrough for introduction of ions and neutrals to the downstream components. In some embodiments, the opening 420 of the inlet 430 has an internal cross-section and/or diameter. In some embodiments, the internal cross-section and/or diameter of the opening 420 and/or the inlet 430 is about 0.1 mm to about 0.7 mm. In some embodiments, the opening 420 and/or the inlet 430 has an internal cross-section and/or diameter of about 0.32 mm. In some embodiments, the inlet 430, for example, can have a cylindrical shape. In some embodiments, the opening 420 of the inlet 430 extends in an upstream direction.

Figure 5:
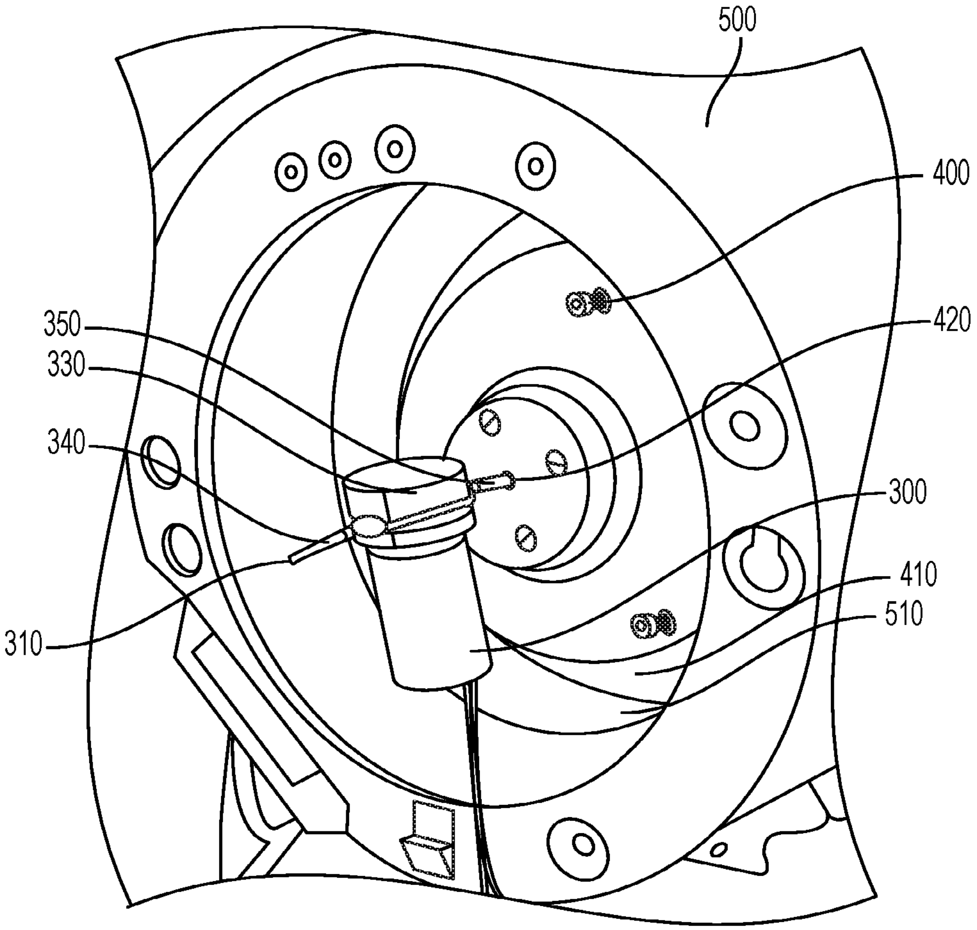
FIG. 5 depicts an exemplary prototype of a DAPI interface disposed between an ion source region and an ion guide chamber and mounted to the ion guide chamber using a mounting snout.

FIG. 5 depicts system 500, including the DAPI 300 (as shown in FIG. 3) mounted to the mounting snout 400 (as shown in FIG. 4) onto the front surface of the ion guide chamber 510. The DAPI 300 is depicted as including an opening 310 that extends into an ion source region. The DAPI 300 is further depicted as including the inlet 340 connected to the pinch valve 330. The DAPI 300 further includes a an outlet 350 that connects the DAPI 300 to the mounting snout 400 by the mounting snout inlet 420. The mounting snout 400 is depicted as attached to the front surface of the ion guide chamber 510 by the flange 410.

The mass spectrometry system can include an atmosphere-to-vacuum orifice of 0.32-mm diameter (4000QT), followed by a TT5600 QJet® assembly, then a Q0 section, and a double element IQ1 lens assembly. Q1 and Q3 include all-metal 5-inch long rod arrays. Q2 has single element IQ2 and IQ3 lenses (2.4-mm diameter) and an auxiliary electrode LINAC that tapers toward Q1. The detector is a standard ETP discrete dynode electron multiplier. The performance is in the ball park of a 4000QT. The mass spectrometry system was modified to operate with a TT5600 orifice (0.60-mm diameter) rather than the standard API4000 orifice (0.32-mm). The DAPI itself was attached to a TT5600 nanospray interface. The mounting snout is 10-mm long. The valve pinches electrically conductive silicone tubing which is used to seal the 1/16 inch OD capillary tube (0.030" ID) and the interface snout. The Turbo V ion source is spaced out from its normal position using two interface spacers.

Figure 6:
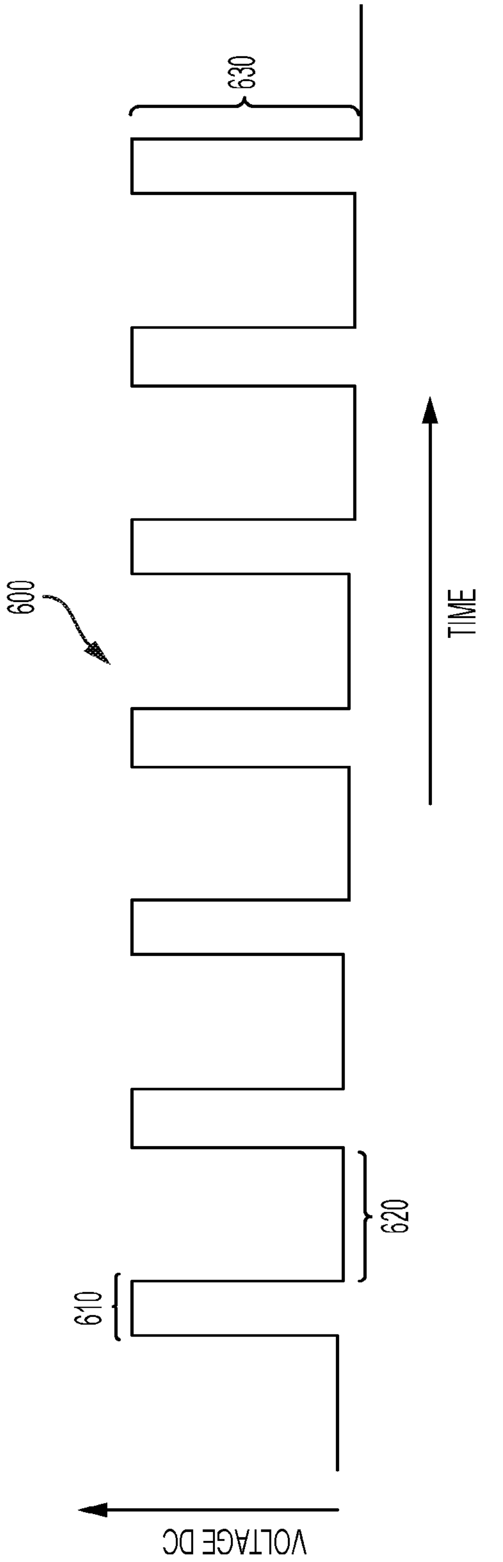
FIG. 6 depicts an exemplary pulsed DC voltage signal that would be applied to actuate the interface.

FIG. 6 depicts an exemplary controller signal 600 that can be configured to intermittently apply a DC voltage to the valve of the interface to switch the valve between closed and opened states. In some embodiments, the valve is normally in a closed state. A DC voltage can be applied to the valve of the interface to actuate, control, modulate, position, and/or switch the valve to the opened state. In some embodiments, a width portion of the signal portion 610 corresponds to voltage levels that can be applied to the valve of the interface to actuate the valve into an opened state. The width of the signal portion 610 corresponds to time periods in which the DC actuating voltage is applied to the valve of the interface thereby opening the valve. The height of the curve 630 corresponds to the amplitude of the DC voltage that is applied to the interface. In some embodiments, when the DC voltage is removed from the valve of the interface the valve is actuated, controlled, modulated, positioned, and/or switched to the closed state. In some embodiments, the width portion of the signal portion 620 corresponds to the time periods in which the actuating voltage is removed from the valve of the interface, to maintain the valve in the closed state.

In some embodiments, the time periods in which an actuating voltage is applied to the valve to actuate the valve into an opened state are substantially similar to the time periods in which the actuating voltage is removed to maintain the valve in a closed state. In some embodiments, the tome periods associated with an opened state can be different than the time periods associated with those of the closed states of the valve. In some embodiments, a repeating signal or a patterned signal can be used to control application of the DC voltage. In some embodiments, the signal can cause the intermittently applied DC voltage.

In some embodiments, the valve of the interface 190 is actuated by a voltage applied to the interface 190, for example, a DC voltage of about 2 V to about 60 V. In some embodiments, the DC voltage applied to the interface that can cause the valve of the interface to actuate to an open state is about 24 V. In some embodiments, the width of the signal portion 610 is a duration of about 1 ms to at least about 100 ms. In some embodiments, the width of the signal portion 620 is a duration of about 25 ms to at least about 1000 ms.

Figure 7:
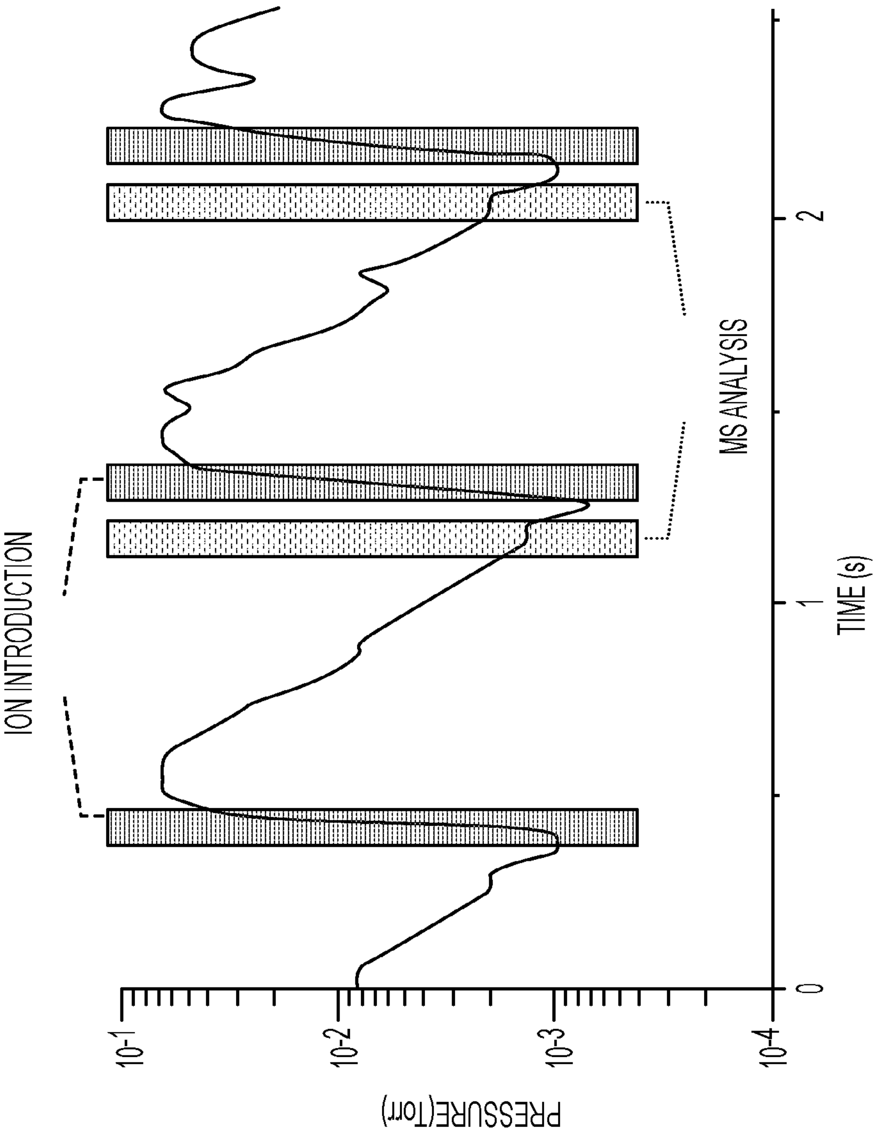
FIG. 7 depicts exemplary data for operation of the mass spectrometry system using a DAPI.

FIG. 7 depicts a DAPI under normal operation (See Gao et al., 80 Anal. Chem., 4026-4032 (2008). The DAPI opens and ions and neutrals rush in followed by closing of the valve and rapid internal vacuum pressure reduction. The DAPI was controlled by a 24 VDC pulse from its normally closed position and the duty cycle was changed using standard Scan Designer segment timing. The typical time to observe ions after the opening of the pinch valve was about 14 ms, after which the ion signal increased to its maximum, and then often declined.

Figure 8:
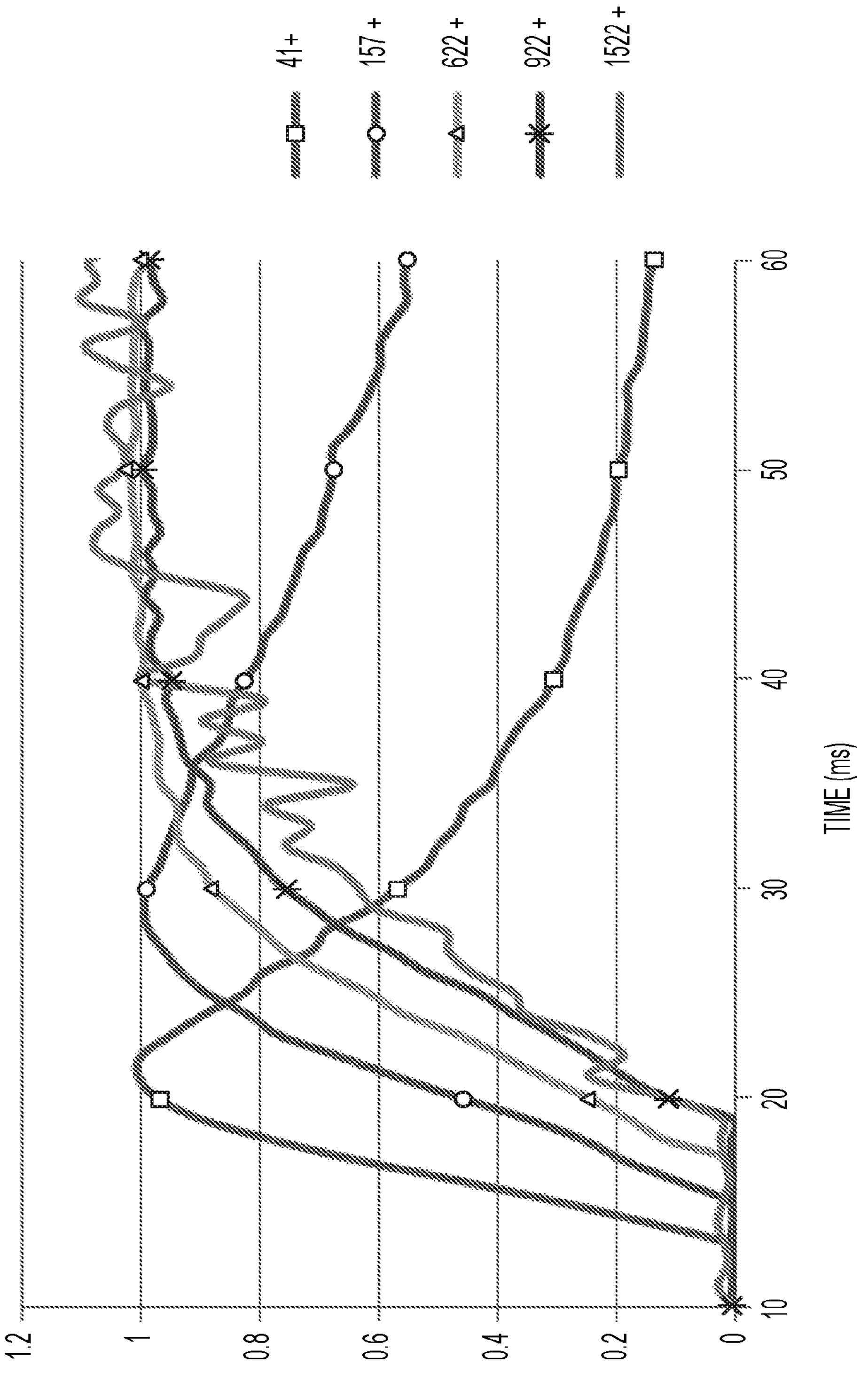
FIG. 8 depicts exemplary data of a normalized ion intensity vs. an arrival time for several different m/z ions at the detector of a mass analyzer of the mass spectrometry system using a DAPI as the interface or valve.

FIG. 8 depicts exemplary data of the results from separate measurements of several ions in which the normalized ion intensity is plotted vs. arrival time at the detector. The "separation" is better at low m/z ions. There are however, still distinct differences observable between the curves for the Agilent 622+, 922+, and 1522+m/z ions. Without being bound to a specific theory, it is presumed that different rise times correspond to different optimum first ion guide (e.g., QJet®) pressures for each m/z ion.

Figure 9:
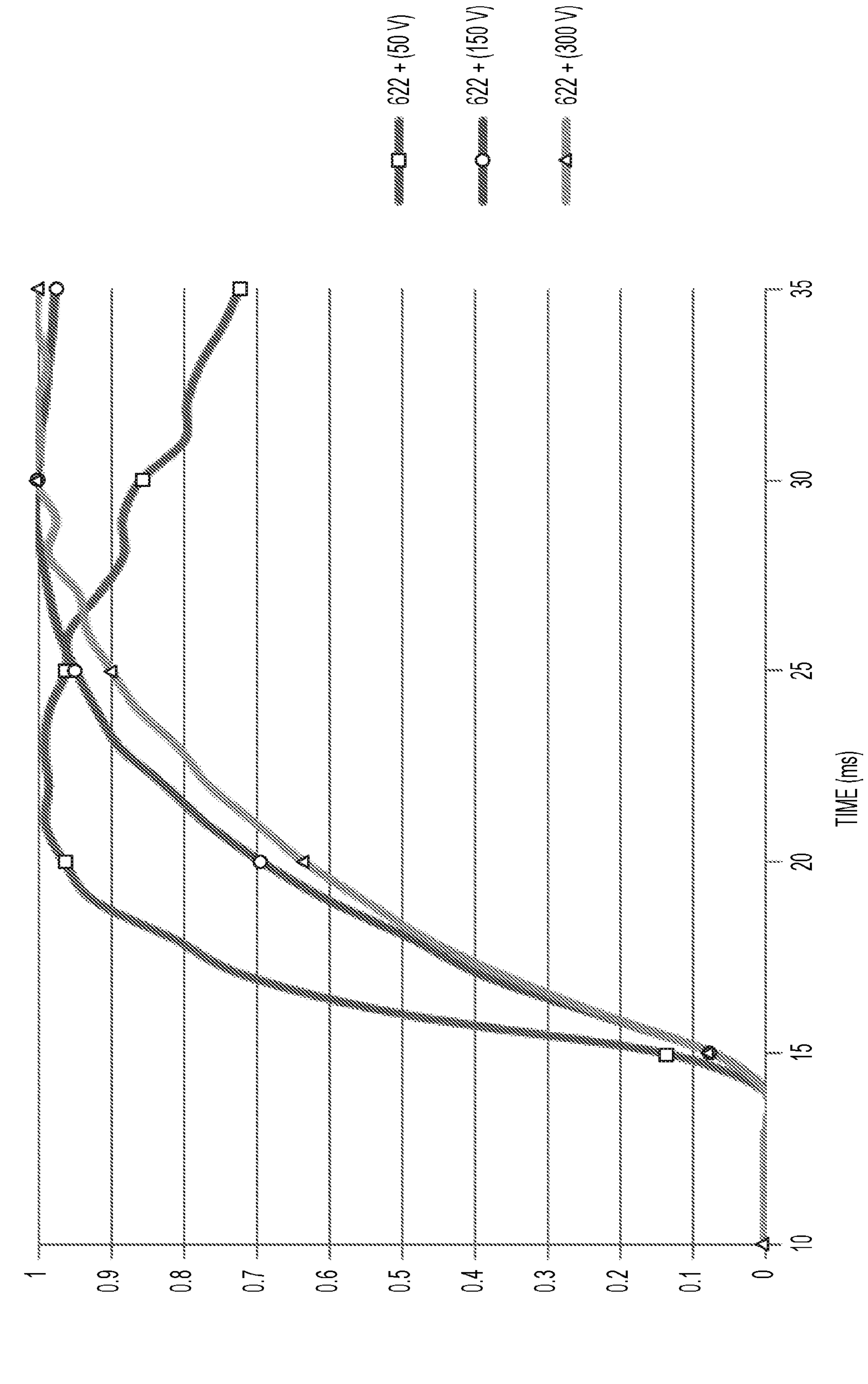
FIG. 9 depicts exemplary data for arrival times for a 622+ ion at three different QJet® RF voltages.

Additionally, the curves can be further affected by changes in the QJet® confining RF voltage. FIG. 9 depicts the arrival times for the Agilent 622+ ion at three different QJet® RF voltages. The higher QJet® RF voltages seem to allow for increased transmission at longer times, meaning at higher QJet® pressures.

Data clearly show that the m/z range of transmitted ions can be modified by choosing a particular time slice to transmit ions to the downstream mass analyzer and used to increase the relative abundances of a user-defined m/z range. The mass spectrometry systems and methods as disclosed herein can be used to reduce the transmission of unwanted ions to downstream ion optical components, which may improve instrument robustness.

Those skilled in the art will know or be able to ascertain using no more than routine experimentation, many equivalents to the embodiments and practices described herein. By way of example, the dimensions of the various components and explicit values for particular electrical signals (e.g., amplitude, frequencies, etc.) applied to the various components are merely exemplary and are not intended to limit the scope of the present teachings. Accordingly, it will be understood that the invention is not to be limited to the embodiments disclosed herein, but is to be understood from the following claims, which are to be interpreted as broadly as allowed under the law.

The present disclosure is not limited to the embodiments described and exemplified above but is capable of variation and modification within the scope of the appended claims. The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

Various publications, including patents, published applications, technical articles and scholarly articles are cited throughout the specification. Each of these cited publications is incorporated by reference herein, in its entirety and for all purposes.

Other Embodiments and Equivalents

While the present disclosure has explicitly discussed certain particular embodiments and examples of the present disclosure, those skilled in the art will appreciate that the disclosure is not intended to be limited to such embodiments or examples. On the contrary, the present disclosure encompasses various alternatives, modifications, and equivalents of such particular embodiments and/or example, as will be appreciated by those of skill in the art.

Accordingly, for example, methods and diagrams of should not be read as limited to a particular described order or arrangement of steps or elements unless explicitly stated or clearly required from context (e.g., otherwise inoperable). Furthermore, different features of particular elements that may be exemplified in different embodiments may be combined with one another in some embodiments.

What is claimed is:

1. A mass spectrometry system, comprising:

an ion source for generating ions;

an ion guide positioned downstream of the ion source;

an interface disposed between the ion source and the ion guide and having a plurality of states to modulate introduction of ions generated by the ion source into the ion guide as a plurality of ion pulses;

a mass analyzer disposed downstream of the ion guide; and one or more controllers for switching the interface between the plurality of states, wherein the one or more controllers are configured to switch the interface between the plurality of states to change a pressure in the ion guide so as to cause a separation of at least a portion of ions in each of the ion pulses according to m/z ratios thereof.

2. The mass spectrometry system of claim 1, wherein the interface comprises a valve configured to be actuated to transition the interface between the the plurality of states.

3. The mass spectrometry system of claim 2, wherein said one or ore controls causes the transition of said valve at a duty cycle in a range of about 1% to about 20%.

4. The mass spectrometry system of claim 2, wherein the valve is configured to be actuated via application of a DC voltage thereto.

5. The mass spectrometry system of claim 4, wherein the one or more controllers pulses said valve of the interface, wherein a pulse cycle comprises a first period of time wherein the interface is switched to allow introduction of ions into the ion guide and a second period of time wherein the interface is switched to inhibit introduction of ions into the ion guide.

6. The mass spectrometry system of claim 1, wherein said interface comprises a Discontinuous Atmospheric Pressure Interface (DAPI).

7. The mass spectrometry system of claim 1, wherein an internal pressure of the ion guide increases to a value in a range of about $10^{-3}$ Torr to about 10 Torr as the interface transitions from one of the states that inhibits introduction of ions into the ion guide to another one of the states that allows introduction of ions into the ion guide.

8. The mass spectrometry system of claim 1, wherein the ion source comprises an atmospheric ionization source.

9. The mass spectrometry system of claim 1, wherein the ion guide comprises a plurality of rods to at least one of which an RF voltage can be applied.

10. The mass spectrometry system of claim 9, further comprising an RF source for applying said RF voltage to said at least one rod.

11. The mass spectrometry system of claim 10, wherein said RF voltage is configured to provide radial confinement of ions within the ion guide.

12. The mass spectrometry system of claim 10, wherein the RF voltage is configured to enhance release and transmission of ions within a desired m/z range from the ion guide to the downstream ion analyzer.

13. The mass spectrometry system of claim 9, wherein the RF voltage has an amplitude in a range of about 10 Vp-p to about 500 Vp-p.

14. The mass spectrometry system of claim 9, wherein the RF voltage has a frequency in a range of about 0.5 MHz to about 2.5 MHz.

15. A method of reducing contamination in a mass spectrometry system, comprising the steps of:

providing the mass spectrometry system of claim 1, identifying a desired m/z range for the mass separated released ions, enhancing the relative intensity of ions released from the ion guide in said desired m/z range; and reducing transmission of unwanted ions to downstream ion optics.

16. The method of claim 1, wherein said plurality of states of the interface comprises an opened state in which ions can be introduced into the ion guide and a closed state in which ions are prevented from entering the ion guide.

17. A process of separating ions in a mass spectrometry system, comprising the steps of:

introducing one or more pulses of gas having entrained ions into an ion guide so as to cause a pressure change in the ion guide, wherein an internal pressure of the ion guide increases as a pulse of gas and ions enters the ion guide and decreases after the pulse of gas and ions is terminated so as to cause a physical separation of at least a portion of the ions according to their m/z ratios, and releasing at least a portion of the ions from the ion guide for transmission into a downstream mass analyzer.

18. The process of claim 17, wherein the ion guide comprises a plurality of rods to at least one of which an RF voltage can be applied.

19. The process of claim 18, further comprising a step of applying an RF voltage to the at least one rod so as to radially confine the ions in the ion guide.

20. The process of claim 17, wherein the step of introducing ions comprises switching an interface disposed between an ion source and an ion guide to an opened state to allow introduction of ions into the ion guide followed by switching the interface to a closed state to inhibit introduction of ions into the ion guide, thereby modulating internal pressure of the ion guide.

21. The process of claim 20, wherein the step of switching the interface between the opened and closed states results in a first period of time during which the internal pressure of the ion guide increases as the pulse of ions enters the ion guide and a second period of time during which the internal pressure of the ion guide decreases after the pulse of ions in terminated.

* * * * *